US012394167B1

(12) United States Patent
Scully et al.

(10) Patent No.: US 12,394,167 B1
(45) Date of Patent: Aug. 19, 2025

(54) WINDOW RESIZING AND VIRTUAL OBJECT REARRANGEMENT IN 3D ENVIRONMENTS

(71) Applicant: Apple Inc., Cupertino, CA (US)

(72) Inventors: Brendan J. Scully, Cos Cob, CT (US); Jonathan R. Dascola, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 18/322,469

(22) Filed: May 23, 2023

Related U.S. Application Data

(60) Provisional application No. 63/367,373, filed on Jun. 30, 2022.

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/016* (2013.01); *G06F 3/04815* (2013.01);
(Continued)

(58) Field of Classification Search
CPC .......... G06F 3/011; G06F 3/012; G06F 3/017; G06T 19/006; G06T 19/20; G06T 2210/41; G06T 2219/2012
See application file for complete search history.

(56) References Cited

U.S. PATENT DOCUMENTS

| | | |
|---|---|---|
| 1,173,824 A | 2/1916 | Mckee |
| 5,515,488 A | 5/1996 | Hoppe et al. |

(Continued)

FOREIGN PATENT DOCUMENTS

| | | |
|---|---|---|
| CA | 3033344 A1 | 2/2018 |
| CN | 104714771 A | 6/2015 |

(Continued)

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.
Corrected Notice of Allowability received for U.S. Appl. No. 17/448,875, mailed on Apr. 24, 2024, 4 pages.
Corrected Notice of Allowability received for U.S. Appl. No. 17/479,791, mailed on May 19, 2023, 2 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.

(Continued)

*Primary Examiner* — Nelson M Rosario
(74) *Attorney, Agent, or Firm* — Kubota & Basol LLP

(57) ABSTRACT

Methods for counter-scaling windows and rearranging objects within those counter-scaled windows in a 3D computer-generated environment is disclosed. The windows can be counter-scaled in accordance with changes to their depth within the 3D computer-generated environment. Objects within the window can be presented at their actual size and with their correct scale relative to each other and with respect to the 3D computer-generated environment, and can maintain their actual size and scale relative to each other and the environment regardless of the depth of the window in the environment. Some embodiments of the disclosure rearrange the layout of the objects to present more or fewer objects in the window as the size of the window changes due to counter-scaling. Depth-dependent window resizing and object rearrangement while preserving actual object size and scale within the 3D computer-generated environment can provide a more authentic viewing experience and can encourage increased user interaction.

28 Claims, 17 Drawing Sheets

(51) Int. Cl.
*G06F 3/04815* (2022.01)
*G06F 3/04847* (2022.01)

(52) U.S. Cl.
CPC ...... *G06F 3/04847* (2013.01); *G06T 2200/24* (2013.01); *G06T 2219/2016* (2013.01)

(56) References Cited

U.S. PATENT DOCUMENTS

| | | | |
|---|---|---|---|
| 5,524,195 A | 6/1996 | Clanton et al. | |
| 5,610,828 A | 3/1997 | Kodosky et al. | |
| 5,737,553 A | 4/1998 | Bartok | |
| 5,740,440 A | 4/1998 | West | |
| 5,751,287 A | 5/1998 | Hahn et al. | |
| 5,758,122 A | 5/1998 | Corda et al. | |
| 5,794,178 A | 8/1998 | Caid et al. | |
| 5,877,766 A | 3/1999 | Bates et al. | |
| 5,900,849 A | 5/1999 | Gallery | |
| 5,933,143 A | 8/1999 | Kobayashi | |
| 5,990,886 A | 11/1999 | Serdy et al. | |
| 6,061,060 A | 5/2000 | Berry et al. | |
| 6,078,310 A | 6/2000 | Tognazzini | |
| 6,108,004 A | 8/2000 | Medl | |
| 6,112,015 A | 8/2000 | Planas et al. | |
| 6,154,559 A | 11/2000 | Beardsley | |
| 6,456,296 B1 | 9/2002 | Cataudella et al. | |
| 6,584,465 B1 | 6/2003 | Zhu et al. | |
| 6,756,997 B1 | 6/2004 | Ward et al. | |
| 7,035,903 B1 | 4/2006 | Baldonado | |
| 7,134,130 B1 | 11/2006 | Thomas | |
| 7,137,074 B1 | 11/2006 | Newton et al. | |
| 7,230,629 B2 | 6/2007 | Reynolds et al. | |
| 7,706,579 B2 | 4/2010 | Oijer | |
| 8,341,541 B2 | 12/2012 | Holecek et al. | |
| 8,593,558 B2 | 11/2013 | Gardiner et al. | |
| 8,724,856 B1 | 5/2014 | King | |
| 8,793,620 B2 | 7/2014 | Stafford | |
| 8,793,729 B2 | 7/2014 | Adimatyam et al. | |
| 8,803,873 B2 | 8/2014 | Yoo et al. | |
| 8,866,880 B2 | 10/2014 | Tan et al. | |
| 8,896,632 B2 | 11/2014 | Macdougall et al. | |
| 8,947,323 B1 | 2/2015 | Raffle et al. | |
| 8,970,478 B2 | 3/2015 | Johansson | |
| 8,970,629 B2 | 3/2015 | Kim et al. | |
| 8,994,718 B2 | 3/2015 | Latta et al. | |
| 9,007,301 B1 | 4/2015 | Raffle et al. | |
| 9,108,109 B2 | 8/2015 | Pare et al. | |
| 9,185,062 B1 | 11/2015 | Yang et al. | |
| 9,189,611 B2 | 11/2015 | Wssingbo | |
| 9,201,500 B2 | 12/2015 | Srinivasan et al. | |
| 9,256,785 B2 | 2/2016 | Qvarfordt | |
| 9,293,118 B2 | 3/2016 | Matsui | |
| 9,316,827 B2 | 4/2016 | Lindley et al. | |
| 9,400,559 B2 | 7/2016 | Latta et al. | |
| 9,448,635 B2 | 9/2016 | Macdougall et al. | |
| 9,448,687 B1 | 9/2016 | Mckenzie et al. | |
| 9,465,479 B2 | 10/2016 | Cho et al. | |
| 9,526,127 B1 | 12/2016 | Taubman et al. | |
| 9,544,257 B2 | 1/2017 | Ogundokun et al. | |
| 9,563,331 B2 | 2/2017 | Poulos et al. | |
| 9,575,559 B2 | 2/2017 | Andrysco | |
| 9,619,519 B1 | 4/2017 | Dorner | |
| 9,672,588 B1 | 6/2017 | Doucette et al. | |
| 9,681,112 B2 | 6/2017 | Son | |
| 9,684,372 B2 | 6/2017 | Xun et al. | |
| 9,734,402 B2 | 8/2017 | Jang et al. | |
| 9,778,814 B2 | 10/2017 | Ambrus et al. | |
| 9,829,708 B1 | 11/2017 | Asada | |
| 9,851,866 B2 | 12/2017 | Goossens et al. | |
| 9,864,498 B2 | 1/2018 | Olsson et al. | |
| 9,886,087 B1 | 2/2018 | Wald et al. | |
| 9,933,833 B2 | 4/2018 | Tu et al. | |
| 9,934,614 B2 | 4/2018 | Ramsby et al. | |
| 10,049,460 B2 | 8/2018 | Romano et al. | |
| 10,203,764 B2 | 2/2019 | Katz et al. | |
| 10,307,671 B2 | 6/2019 | Barney et al. | |
| 10,353,532 B1 | 7/2019 | Holz et al. | |
| 10,394,320 B2 | 8/2019 | George-svahn et al. | |
| 10,534,439 B2 | 1/2020 | Raffa et al. | |
| 10,565,448 B2 | 2/2020 | Bell et al. | |
| 10,664,048 B2 | 5/2020 | Cieplinski et al. | |
| 10,664,050 B2 | 5/2020 | Alcaide et al. | |
| 10,678,403 B2 | 6/2020 | Duarte et al. | |
| 10,699,488 B1 | 6/2020 | Terrano | |
| 10,754,434 B2 | 8/2020 | Hall et al. | |
| 10,768,693 B2 | 9/2020 | Powderly et al. | |
| 10,861,242 B2 | 12/2020 | Lacey et al. | |
| 10,890,967 B2 | 1/2021 | Stellmach et al. | |
| 10,956,724 B1 | 3/2021 | Terrano | |
| 10,983,663 B2 | 4/2021 | Iglesias | |
| 11,055,920 B1 | 7/2021 | Bramwell et al. | |
| 11,079,995 B1 | 8/2021 | Hulbert et al. | |
| 11,082,463 B2 | 8/2021 | Felman | |
| 11,112,875 B1 | 9/2021 | Zhou et al. | |
| 11,175,791 B1 | 11/2021 | Patnaikuni et al. | |
| 11,199,898 B2 | 12/2021 | Blume et al. | |
| 11,200,742 B1 | 12/2021 | Post et al. | |
| 11,232,643 B1 | 1/2022 | Stevens et al. | |
| 11,294,472 B2 | 4/2022 | Tang et al. | |
| 11,294,475 B1 | 4/2022 | Pinchon et al. | |
| 11,307,653 B1 * | 4/2022 | Qian | G06F 3/012 |
| 11,340,756 B2 | 5/2022 | Faulkner et al. | |
| 11,348,300 B2 | 5/2022 | Zimmermann et al. | |
| 11,461,973 B2 | 10/2022 | Pinchon | |
| 11,496,571 B2 | 11/2022 | Berliner et al. | |
| 11,573,363 B2 | 2/2023 | Zou et al. | |
| 11,574,452 B2 | 2/2023 | Berliner et al. | |
| 11,720,171 B2 | 8/2023 | Pastrana Vicente et al. | |
| 11,726,577 B2 | 8/2023 | Katz | |
| 11,733,824 B2 | 8/2023 | Iskandar et al. | |
| 11,762,457 B1 | 9/2023 | Ikkai et al. | |
| 12,099,653 B2 | 9/2024 | Chawda et al. | |
| 12,099,695 B1 | 9/2024 | Smith et al. | |
| 12,113,948 B1 | 10/2024 | Smith et al. | |
| 12,118,200 B1 | 10/2024 | Shutzberg et al. | |
| 2001/0047250 A1 | 11/2001 | Schuller et al. | |
| 2002/0044152 A1 | 4/2002 | Abbott et al. | |
| 2002/0065778 A1 | 5/2002 | Bouet et al. | |
| 2003/0038754 A1 | 2/2003 | Goldstein et al. | |
| 2003/0151611 A1 | 8/2003 | Turpin et al. | |
| 2003/0222924 A1 | 12/2003 | Baron | |
| 2004/0059784 A1 | 3/2004 | Caughey | |
| 2004/0104806 A1 | 6/2004 | Yui et al. | |
| 2004/0243926 A1 | 12/2004 | Trenbeath et al. | |
| 2005/0044510 A1 | 2/2005 | Yi | |
| 2005/0100210 A1 | 5/2005 | Rice et al. | |
| 2005/0138572 A1 | 6/2005 | Good et al. | |
| 2005/0144570 A1 | 6/2005 | Loverin et al. | |
| 2005/0144571 A1 | 6/2005 | Loverin et al. | |
| 2005/0175218 A1 | 8/2005 | Vertegaal et al. | |
| 2005/0198143 A1 | 9/2005 | Moody et al. | |
| 2005/0216866 A1 | 9/2005 | Rosen et al. | |
| 2006/0028400 A1 | 2/2006 | Lapstun et al. | |
| 2006/0080702 A1 | 4/2006 | Diez et al. | |
| 2006/0156228 A1 | 7/2006 | Gallo et al. | |
| 2006/0256083 A1 | 11/2006 | Rosenberg | |
| 2006/0283214 A1 | 12/2006 | Donadon et al. | |
| 2007/0259716 A1 | 11/2007 | Mattice et al. | |
| 2008/0181502 A1 | 7/2008 | Yang | |
| 2008/0211771 A1 | 9/2008 | Richardson | |
| 2009/0064035 A1 | 3/2009 | Shibata et al. | |
| 2009/0146779 A1 | 6/2009 | Kumar et al. | |
| 2009/0231356 A1 | 9/2009 | Barnes et al. | |
| 2010/0097375 A1 | 4/2010 | Tadaishi et al. | |
| 2010/0177049 A1 | 7/2010 | Levy et al. | |
| 2010/0188503 A1 | 7/2010 | Tsai et al. | |
| 2010/0269145 A1 | 10/2010 | Ingrassia et al. | |
| 2011/0018895 A1 | 1/2011 | Buzyn et al. | |
| 2011/0018896 A1 | 1/2011 | Buzyn et al. | |
| 2011/0098029 A1 | 4/2011 | Rhoads et al. | |
| 2011/0156879 A1 | 6/2011 | Matsushita et al. | |
| 2011/0169927 A1 | 7/2011 | Mages et al. | |
| 2011/0175932 A1 | 7/2011 | Yu et al. | |
| 2011/0216060 A1 | 9/2011 | Weising et al. | |
| 2011/0254865 A1 | 10/2011 | Yee et al. | |

(56) References Cited

U.S. PATENT DOCUMENTS

| | | |
|---|---|---|
| 2011/0310001 A1 | 12/2011 | Madau et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0124525 A1 | 5/2012 | Kang |
| 2012/0131631 A1 | 5/2012 | Bhogal et al. |
| 2012/0170840 A1 | 7/2012 | Caruso et al. |
| 2012/0184372 A1 | 7/2012 | Laarakkers et al. |
| 2012/0256967 A1 | 10/2012 | Baldwin et al. |
| 2012/0257035 A1 | 10/2012 | Larsen |
| 2012/0272179 A1 | 10/2012 | Stafford |
| 2013/0027860 A1 | 1/2013 | Masaki et al. |
| 2013/0127850 A1 | 5/2013 | Bindon |
| 2013/0148850 A1 | 6/2013 | Matsuda et al. |
| 2013/0169533 A1 | 7/2013 | Jahnke |
| 2013/0190044 A1 | 7/2013 | Kulas |
| 2013/0211843 A1 | 8/2013 | Clarkson |
| 2013/0229345 A1 | 9/2013 | Day et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0300648 A1 | 11/2013 | Kim et al. |
| 2013/0300654 A1 | 11/2013 | Seki |
| 2013/0326364 A1 | 12/2013 | Latta et al. |
| 2013/0342564 A1 | 12/2013 | Kinnebrew et al. |
| 2013/0342570 A1 | 12/2013 | Kinnebrew et al. |
| 2014/0002338 A1 | 1/2014 | Raffa et al. |
| 2014/0028548 A1 | 1/2014 | Bychkov et al. |
| 2014/0049462 A1 | 2/2014 | Weinberger et al. |
| 2014/0068692 A1 | 3/2014 | Archibong et al. |
| 2014/0075361 A1 | 3/2014 | Reynolds et al. |
| 2014/0108942 A1 | 4/2014 | Freeman et al. |
| 2014/0125584 A1 | 5/2014 | Xun et al. |
| 2014/0126782 A1 | 5/2014 | Takai et al. |
| 2014/0132499 A1 | 5/2014 | Schwesinger et al. |
| 2014/0139426 A1 | 5/2014 | Kryze et al. |
| 2014/0164928 A1 | 6/2014 | Kim |
| 2014/0168453 A1 | 6/2014 | Shoemake et al. |
| 2014/0198017 A1 | 7/2014 | Lamb et al. |
| 2014/0232639 A1 | 8/2014 | Hayashi et al. |
| 2014/0247210 A1 | 9/2014 | Henderek et al. |
| 2014/0258942 A1 | 9/2014 | Kutliroff et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0304612 A1 | 10/2014 | Collin |
| 2014/0320404 A1 | 10/2014 | Kasahara |
| 2014/0347391 A1 | 11/2014 | Keane et al. |
| 2014/0351753 A1 | 11/2014 | Shin et al. |
| 2014/0372957 A1 | 12/2014 | Keane et al. |
| 2015/0009118 A1 | 1/2015 | Thomas et al. |
| 2015/0035822 A1 | 2/2015 | Arsan et al. |
| 2015/0042679 A1 | 2/2015 | Järvenpää |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0123890 A1 | 5/2015 | Kapur et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0177937 A1 | 6/2015 | Poletto et al. |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0242095 A1 | 8/2015 | Sonnenberg |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0062636 A1 | 3/2016 | Jung et al. |
| 2016/0093108 A1 | 3/2016 | Mao et al. |
| 2016/0098094 A1 | 4/2016 | Minkkinen |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0196692 A1 | 7/2016 | Kjallstrom et al. |
| 2016/0216768 A1 | 7/2016 | Goetz et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0306434 A1 | 10/2016 | Ferrin |
| 2016/0313890 A1 | 10/2016 | Walline et al. |
| 2016/0350973 A1 | 12/2016 | Shapira et al. |
| 2016/0357266 A1 | 12/2016 | Patel et al. |
| 2016/0379409 A1 | 12/2016 | Gavriliuc et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0060230 A1 | 3/2017 | Faaborg et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0153866 A1 | 6/2017 | Grinberg et al. |
| 2017/0206691 A1 | 7/2017 | Harrises et al. |
| 2017/0212583 A1 | 7/2017 | Krasadakis |
| 2017/0228130 A1 | 8/2017 | Palmaro |
| 2017/0236332 A1 | 8/2017 | Kipman et al. |
| 2017/0285737 A1 | 10/2017 | Khalid et al. |
| 2017/0308163 A1 | 10/2017 | Cieplinski et al. |
| 2017/0315715 A1 | 11/2017 | Fujita et al. |
| 2017/0344223 A1 | 11/2017 | Holzer et al. |
| 2017/0358141 A1 | 12/2017 | Stafford et al. |
| 2017/0364198 A1 | 12/2017 | Yoganandan et al. |
| 2018/0045963 A1 | 2/2018 | Hoover et al. |
| 2018/0075658 A1 | 3/2018 | Lanier et al. |
| 2018/0081519 A1 | 3/2018 | Kim |
| 2018/0095634 A1 | 4/2018 | Alexander |
| 2018/0101223 A1 | 4/2018 | Ishihara et al. |
| 2018/0114364 A1 | 4/2018 | Mcphee et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0181199 A1 | 6/2018 | Harvey et al. |
| 2018/0181272 A1 | 6/2018 | Olsson et al. |
| 2018/0188802 A1 | 7/2018 | Okumura |
| 2018/0197336 A1 | 7/2018 | Rochford et al. |
| 2018/0210628 A1 | 7/2018 | Mcphee et al. |
| 2018/0239144 A1 | 8/2018 | Woods et al. |
| 2018/0275753 A1 | 9/2018 | Publicover et al. |
| 2018/0300023 A1 | 10/2018 | Hein |
| 2018/0315248 A1 | 11/2018 | Bastov et al. |
| 2018/0322701 A1 | 11/2018 | Pahud et al. |
| 2018/0348861 A1 | 12/2018 | Uscinski et al. |
| 2019/0018498 A1 | 1/2019 | West et al. |
| 2019/0034076 A1 | 1/2019 | Vinayak et al. |
| 2019/0050062 A1 | 2/2019 | Chen et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0101991 A1 | 4/2019 | Brennan |
| 2019/0130633 A1 | 5/2019 | Haddad et al. |
| 2019/0146128 A1 | 5/2019 | Cao et al. |
| 2019/0172261 A1 | 6/2019 | Alt et al. |
| 2019/0204906 A1 | 7/2019 | Ross et al. |
| 2019/0227763 A1 | 7/2019 | Kaufthal |
| 2019/0251884 A1 | 8/2019 | Burns et al. |
| 2019/0258365 A1 | 8/2019 | Zurmoehle et al. |
| 2019/0279407 A1 | 9/2019 | Mchugh et al. |

(56) References Cited

U.S. PATENT DOCUMENTS

| | | |
|---|---|---|
| 2019/0294312 A1 | 9/2019 | Rohrbacher |
| 2019/0310757 A1 | 10/2019 | Lee et al. |
| 2019/0324529 A1 | 10/2019 | Stellmach et al. |
| 2019/0332244 A1 | 10/2019 | Beszteri et al. |
| 2019/0339770 A1 | 11/2019 | Kurlethimar et al. |
| 2019/0346678 A1 | 11/2019 | Nocham |
| 2019/0346922 A1 | 11/2019 | Young et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0370492 A1 | 12/2019 | Falchuk et al. |
| 2019/0371072 A1 | 12/2019 | Lindberg et al. |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0012341 A1 | 1/2020 | Stellmach et al. |
| 2020/0026349 A1 | 1/2020 | Fontanel et al. |
| 2020/0043243 A1 | 2/2020 | Bhushan et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0098140 A1 | 3/2020 | Jagnow et al. |
| 2020/0098173 A1 | 3/2020 | Mccall |
| 2020/0117213 A1 | 4/2020 | Tian et al. |
| 2020/0128232 A1 | 4/2020 | Hwang et al. |
| 2020/0129850 A1 | 4/2020 | Ohashi |
| 2020/0159017 A1 | 5/2020 | Lin et al. |
| 2020/0225735 A1 | 7/2020 | Schwarz |
| 2020/0225746 A1* | 7/2020 | Bar-Zeev ............ G06F 3/04815 |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0285314 A1 | 9/2020 | Cieplinski et al. |
| 2020/0356221 A1 | 11/2020 | Behzadi et al. |
| 2020/0357374 A1 | 11/2020 | Verweij et al. |
| 2020/0363867 A1 | 11/2020 | Azimi et al. |
| 2020/0371673 A1* | 11/2020 | Faulkner ................ G06F 3/017 |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2021/0074062 A1 | 3/2021 | Madonna et al. |
| 2021/0090337 A1 | 3/2021 | Ravasz et al. |
| 2021/0096726 A1 | 4/2021 | Faulkner et al. |
| 2021/0103333 A1 | 4/2021 | Cieplinski et al. |
| 2021/0125414 A1 | 4/2021 | Berkebile |
| 2021/0191600 A1 | 6/2021 | Lemay et al. |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0327140 A1 | 10/2021 | Rothkopf et al. |
| 2021/0350564 A1 | 11/2021 | Peuhkurinen et al. |
| 2021/0350604 A1 | 11/2021 | Pejsa et al. |
| 2021/0368136 A1 | 11/2021 | Chalmers et al. |
| 2021/0375022 A1 | 12/2021 | Lee et al. |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0030197 A1 | 1/2022 | Ishimoto |
| 2022/0070241 A1 | 3/2022 | Yerli |
| 2022/0083197 A1 | 3/2022 | Rockel et al. |
| 2022/0092862 A1 | 3/2022 | Faulkner et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121344 A1 | 4/2022 | Pastrana Vicente et al. |
| 2022/0130107 A1 | 4/2022 | Lindh |
| 2022/0137705 A1 | 5/2022 | Hashimoto et al. |
| 2022/0155909 A1 | 5/2022 | Kawashima et al. |
| 2022/0157083 A1 | 5/2022 | Jandhyala et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0214743 A1 | 7/2022 | Dascola et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0245888 A1 | 8/2022 | Singh et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0317776 A1 | 10/2022 | Sundstrom et al. |
| 2022/0326837 A1 | 10/2022 | Dessero et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0413691 A1 | 12/2022 | Becker et al. |
| 2022/0414999 A1 | 12/2022 | Ravasz et al. |
| 2023/0004216 A1 | 1/2023 | Rodgers et al. |
| 2023/0008537 A1 | 1/2023 | Henderson et al. |
| 2023/0021861 A1 | 1/2023 | Fujiwara et al. |
| 2023/0032545 A1 | 2/2023 | Mindlin et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0092282 A1 | 3/2023 | Boesel et al. |
| 2023/0093979 A1 | 3/2023 | Stauber et al. |
| 2023/0100689 A1 | 3/2023 | Chiu et al. |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168788 A1 | 6/2023 | Faulkner et al. |
| 2023/0185426 A1 | 6/2023 | Rockel et al. |
| 2023/0186577 A1 | 6/2023 | Rockel et al. |
| 2023/0244857 A1 | 8/2023 | Weiss et al. |
| 2023/0259265 A1 | 8/2023 | Krivoruchko et al. |
| 2023/0273706 A1 | 8/2023 | Smith et al. |
| 2023/0274504 A1 | 8/2023 | Ren et al. |
| 2023/0308610 A1 | 9/2023 | Henderson et al. |
| 2023/0316634 A1 | 10/2023 | Chiu et al. |
| 2023/0325004 A1 | 10/2023 | Burns et al. |
| 2023/0333646 A1 | 10/2023 | Pastrana Vicente et al. |
| 2023/0359199 A1 | 11/2023 | Adachi et al. |
| 2023/0384907 A1 | 11/2023 | Boesel et al. |
| 2023/0388357 A1 | 11/2023 | Faulkner et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094882 A1 | 3/2024 | Brewer et al. |
| 2024/0095984 A1 | 3/2024 | Ren et al. |
| 2024/0103613 A1 | 3/2024 | Chawda et al. |
| 2024/0103676 A1 | 3/2024 | Pastrana Vicente et al. |
| 2024/0103684 A1 | 3/2024 | Yu et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104873 A1 | 3/2024 | Pastrana Vicente et al. |
| 2024/0104877 A1 | 3/2024 | Henderson et al. |
| 2024/0119682 A1 | 4/2024 | Rudman et al. |
| 2024/0221291 A1 | 7/2024 | Henderson et al. |
| 2024/0272782 A1 | 8/2024 | Pastrana Vicente et al. |
| 2024/0291953 A1 | 8/2024 | Cerra et al. |
| 2024/0310971 A1 | 9/2024 | Kawashima et al. |
| 2024/0361835 A1 | 10/2024 | Hylak et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0404206 A1 | 12/2024 | Chiu et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0008057 A1 | 1/2025 | Chiu et al. |
| 2025/0013343 A1 | 1/2025 | Smith et al. |
| 2025/0013344 A1 | 1/2025 | Smith et al. |

(56) References Cited

U.S. PATENT DOCUMENTS

| | | |
|---|---|---|
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0036255 A1 | 1/2025 | Pastrana Vicente et al. |

FOREIGN PATENT DOCUMENTS

| | | |
|---|---|---|
| CN | 105264461 A | 1/2016 |
| CN | 105264478 A | 1/2016 |
| CN | 108633307 A | 10/2018 |
| CN | 110476142 A | 11/2019 |
| CN | 110673718 A | 1/2020 |
| CN | 109491508 B | 8/2022 |
| EP | 0816983 A2 | 1/1998 |
| EP | 1530115 A2 | 5/2005 |
| EP | 2551763 A1 | 1/2013 |
| EP | 2741175 A2 | 6/2014 |
| EP | 2947545 A1 | 11/2015 |
| EP | 3088997 A1 | 11/2016 |
| EP | 3249497 A1 | 11/2017 |
| EP | 3316075 A1 | 5/2018 |
| EP | 3451135 A1 | 3/2019 |
| EP | 3503101 A1 | 6/2019 |
| EP | 3570144 A1 | 11/2019 |
| EP | 3588255 A1 | 1/2020 |
| EP | 3654147 A1 | 5/2020 |
| JP | H06-4596 A | 1/1994 |
| JP | H10-51711 A | 2/1998 |
| JP | H10-78845 A | 3/1998 |
| JP | 2005-215144 A | 8/2005 |
| JP | 2005-333524 A | 12/2005 |
| JP | 2006-107048 A | 4/2006 |
| JP | 2006-146803 A | 6/2006 |
| JP | 2006-295236 A | 10/2006 |
| JP | 2011-203880 A | 10/2011 |
| JP | 2012-234550 A | 11/2012 |
| JP | 2013-196158 A | 9/2013 |
| JP | 2013-254358 A | 12/2013 |
| JP | 2013-257716 A | 12/2013 |
| JP | 2014-21565 A | 2/2014 |
| JP | 2014-59840 A | 4/2014 |
| JP | 2014-71663 A | 4/2014 |
| JP | 2014-99184 A | 5/2014 |
| JP | 2014-514652 A | 6/2014 |
| JP | 2015-56173 A | 3/2015 |
| JP | 2015-515040 A | 5/2015 |
| JP | 2015-118332 A | 6/2015 |
| JP | 2016-96513 A | 5/2016 |
| JP | 2016-194744 A | 11/2016 |
| JP | 2017-27206 A | 2/2017 |
| JP | 2017-58528 A | 3/2017 |
| JP | 2018-5516 A | 1/2018 |
| JP | 2018-5517 A | 1/2018 |
| JP | 2018-41477 A | 3/2018 |
| JP | 2018-106499 A | 7/2018 |
| JP | 2019-40333 A | 3/2019 |
| JP | 2019-169154 A | 10/2019 |
| JP | 2019-175449 A | 10/2019 |
| JP | 2019-536131 A | 12/2019 |
| JP | 2022-053334 A | 4/2022 |
| KR | 10-2011-0017236 A | 2/2011 |
| KR | 10-2016-0012139 A | 2/2016 |
| KR | 10-2019-0100957 A | 8/2019 |
| WO | 2010/026519 A1 | 3/2010 |
| WO | 2011/008638 A1 | 1/2011 |
| WO | 2012/145180 A1 | 10/2012 |
| WO | 2014/203301 A1 | 12/2014 |
| WO | 2015/195216 A1 | 12/2015 |
| WO | 2017/088487 A1 | 6/2017 |
| WO | 2018/046957 A2 | 3/2018 |
| WO | 2018/175735 A1 | 9/2018 |
| WO | 2019/142560 A1 | 7/2019 |
| WO | 2019/217163 A1 | 11/2019 |
| WO | 2020/066682 A1 | 4/2020 |
| WO | 2021/173839 A1 | 9/2021 |
| WO | 2021/202783 A1 | 10/2021 |
| WO | 2022/046340 A1 | 3/2022 |
| WO | 2022/055822 A1 | 3/2022 |
| WO | 2022/066399 A1 | 3/2022 |
| WO | 2022/066535 A2 | 3/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2023/096940 A2 | 6/2023 |
| WO | 2023/141535 A1 | 7/2023 |

OTHER PUBLICATIONS

Corrected Notice of Allowability received for U.S. Appl. No. 17/932,999, mailed on Jan. 23, 2025, 9 pages.
Corrected Notice of Allowability received for U.S. Appl. No. 17/935,095, mailed on Oct. 18, 2024, 3 pages.
Corrected Notice of Allowability received for U.S. Appl. No. 18/154,757, mailed on Aug. 30, 2024, 2 pages.
Corrected Notice of Allowability received for U.S. Appl. No. 18/174,337, mailed on Jan. 15, 2025, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 18/465,098, mailed on Mar. 13, 2024, 3 pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
European Search Report received for European Patent Application No. 21801378.7, mailed on Jul. 10, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Extended European Search Report received for European Patent Application No. 24159868.9, mailed on Oct. 9, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Extended European Search Report received for European Patent Application No. 24190323.6, mailed on Dec. 12, 2024, 9 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 17/816,314, mailed on Jan. 20, 2023, 11 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.

(56) References Cited

OTHER PUBLICATIONS

Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
Final Office Action received for U.S. Appl. No. 18/473,196, mailed on Dec. 6, 2024, 22 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/018213, mailed on Jul. 26, 2023, 6 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
Search Report received for PCT Application No. PCT/US2024/032314, mailed on Nov. 11, 2024, 6 pages.
Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html>[Search Date Aug. 22, 2023], Sep. 20, 2021, 8 pages (1 page of English Abstract and 7 pages of Official Copy).
International Search Report received for PCT Patent Application No. PCT/US2021/050948, mailed on Mar. 4, 2022, 6 pages.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2022/076985, mailed on Feb. 20, 2023, 5 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.
International Search Report received for PCT Patent Application No. PCT/US2024/039190, mailed on Nov. 22, 2024, 5 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023 30 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/932,655, mailed on Apr. 20, 2023, 10 pages.
Non-Final Office Action received for U.S. Appl. No. 17/932,999 mailed on Feb. 23, 2024, 22 pages.
Non-Final Office Action received for U.S. Appl. No. 17/935,095 mailed on Jun. 22, 2023, 15 pages.
Non-Final Office Action received for U.S. Appl. No. 18/149,640, mailed on Jan. 15, 2025, 17 pages.
Non-Final Office Action received for U.S. Appl. No. 18/154,697, mailed on Nov. 24, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/336,770, mailed on Jun. 5, 2024, 12 pages.
Non-Final Office Action received for U.S. Appl. No. 18/375,280, mailed on Nov. 27, 2024, 17 pages.
Non-Final Office Action received for U.S. Appl. No. 18/473,196, mailed on Aug. 16, 2024, 21 pages.
Notice of Allowance received for U.S. Appl. No. 18/154,757, mailed on Aug. 26, 2024, 12 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.

(56) References Cited

OTHER PUBLICATIONS

Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/816,314, mailed on Jan. 4, 2024, 6 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/932,999, mailed on Sep. 12, 2024, 9 pages.
Notice of Allowance received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2024, 10 pages.
Notice of Allowance received for U.S. Appl. No. 18/154,757, mailed on Jan. 23, 2025, 12 pages.
Notice of Allowance received for U.S. Appl. No. 18/154,757, mailed on May 10, 2024, 12 pages.
Notice of Allowance received for U.S. Appl. No. 18/174,337, mailed on Jan. 2, 2025, 8 pages.
Notice of Allowance received for U.S. Appl. No. 18/336,770, mailed on Nov. 29, 2024, 9 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 8 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Notice of Allowance received for U.S. Appl. No. 18/515,188, mailed on Nov. 27, 2024, 9 pages.
Notice of Allowance received for U.S. Appl. No. 18/671,936, mailed on Jan. 15, 2025, 9 pages.
Restriction Requirement received for U.S. Appl. No. 17/932,999, mailed on Oct. 3, 2023, 6 pages.
Restriction Requirement received for U.S. Appl. No. 18/473,187, mailed on Dec. 30, 2024, 5 pages.
Search Report received for Chinese Patent Application No. 202310873465.7, mailed on Feb. 1, 2024, 5 pages (2 pages of English Translation and 3 pages of Official Copy).
Supplemental Notice of Allowance received for U.S. Appl. No. 14/531,874, mailed on Jul. 26, 2017, 5 pages.
Supplemental Notice of Allowance received for U.S. Appl. No. 18/515, 188, mailed on Dec. 12, 2024, 2 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Chatterjee et al., "Gaze+Gesture: Expressive, Precise and Targeted Free-Space Interactions", ICMI '15, Nov. 9-13, 2015, 8 pages.
Fatima et al., "Eye Movement Based Human Computer Interaction", 3rd International Conference On Recent Advances In Information Technology (RAIT), Mar. 3, 2016, pp. 489-494.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Lin et al., "Towards Naturally Grabbing and Moving Objects in VR", IS&T International Symposium on Electronic Imaging and The Engineering Reality of Virtual Reality, 2016, 6 pages.
McGill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Pfeuffer et al., "Gaze and Touch Interaction on Tablets", UIST '16, Tokyo, Japan, ACM, Oct. 16-19, 2016, pp. 301-311.
Schenk et al., "SPOCK: A Smooth Pursuit Oculomotor Control Kit", CHI'16 Extended Abstracts, San Jose, CA, USA, ACM, May 7-12, 2016, pp. 2681-2687.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.

* cited by examiner

WINDOW RESIZING AND VIRTUAL OBJECT REARRANGEMENT IN 3D ENVIRONMENTS

CROSS-REFERENCE TO RELATED APPLICATIONS

This application claims the benefit of U.S. Provisional Application No. 63/367,373, filed Jun. 30, 2022, the content of which is incorporated herein by reference in its entirety for all purposes.

FIELD OF THE DISCLOSURE

This relates generally to methods for resizing windows and rearranging virtual object representations within those windows in a computer-generated environment.

BACKGROUND OF THE DISCLOSURE

Computer-generated environments are environments where at least some windows and virtual object representations displayed for a user's viewing are generated using a computer. Users may interact with a computer-generated environment by displaying and utilizing windows and virtual object representations within the computer-generated environment.

SUMMARY OF THE DISCLOSURE

Embodiments of the disclosure are directed to methods for resizing windows (e.g., browser windows) in a three-dimensional (3D) computer-generated environment, and rearranging virtual object representations (e.g., virtual 2D or 3D objects, models or images of products and text) within those windows. Some embodiments described in this disclosure are directed to moving the windows around and counter-scaling those windows in accordance with changes to their depth within the 3D computer-generated environment to provide an improved user experience. In some embodiments, object representations within the window can be presented at their actual size (their correct physical size within and with respect to the presented size of the 3D computer-generated environment) and at their actual scale relative to each other and with respect to the presented scale of the 3D computer-generated environment, and can maintain their actual size and scale relative to each other and the environment regardless of the depth of the window in the environment. Some embodiments of the disclosure rearrange the layout of the object representations to present more or fewer object representations in the window as the size of the window changes due to counter-scaling. Depth-dependent window resizing and object representation rearrangement while preserving actual object representation size and scale within the 3D computer-generated environment can provide a more authentic, accurate and easier viewing experience and can encourage increased user interaction. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
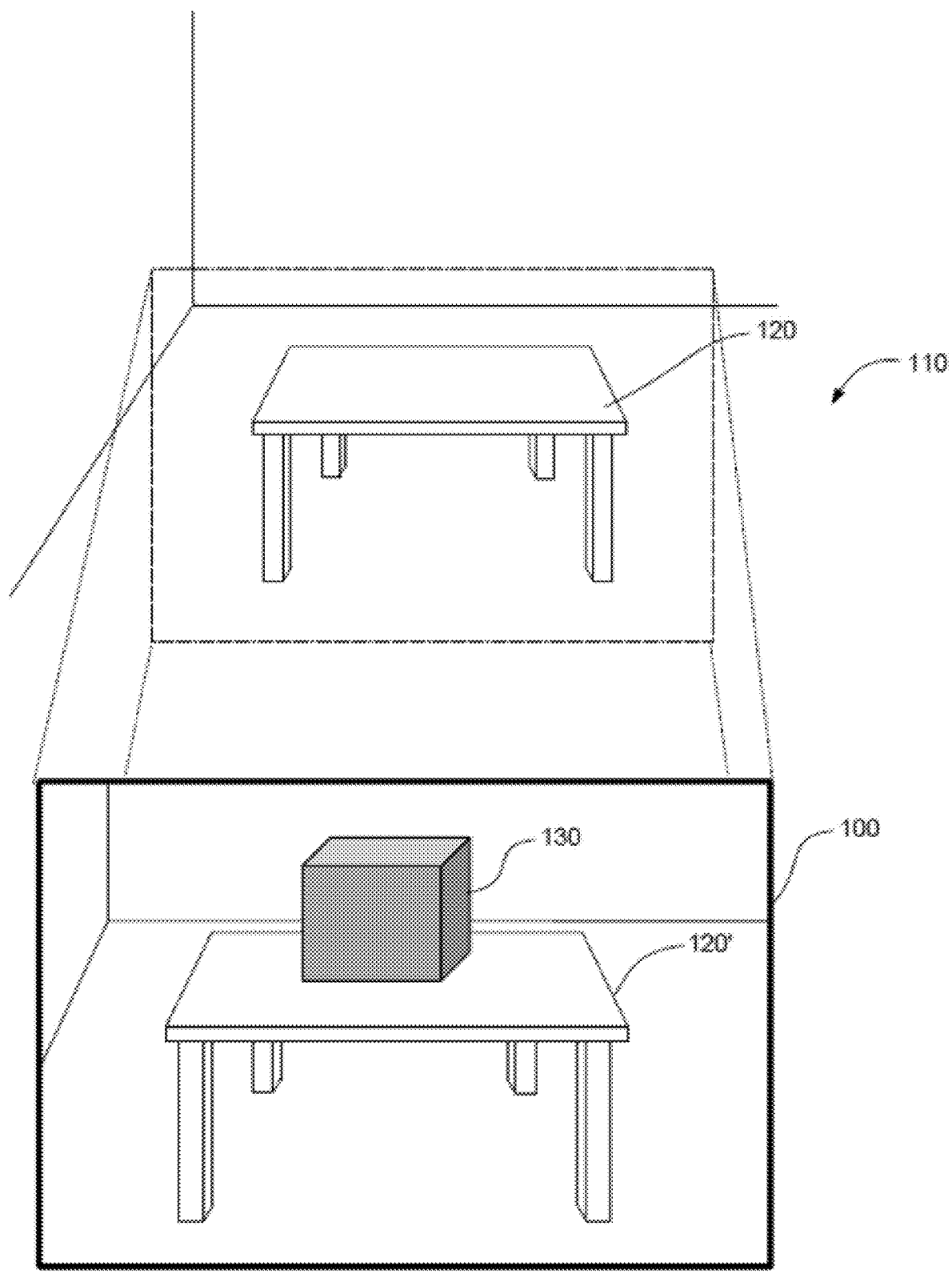
FIG. 1 illustrates an example electronic device presenting a 3D computer-generated environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a respective selectable option (e.g., control element) could be referred to as a "first" or "second" selectable option, without implying that the respective selectable option has different characteristics based merely on the fact that the respective selectable option is referred to as a "first" or "second" selectable option. On the other hand, a selectable option referred to as a "first" selectable option and a selectable option referred to as a "second" selectable option are both selectable options, but are not the same selectable option, unless explicitly described as such.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the user may interact with the user interface or computer-generated environment (e.g., an extended reality environment) via eye focus (gaze) and/or eye movement and/or via position, orientation or movement of one or more fingers/hands (or a representation of one or more fingers/hands) in space relative to the user interface or computer-generated environment. In some embodiments, eye focus/movement and/or position/orientation/movement of fingers/hands can be captured by cameras and other sensors (e.g., motion sensors). In some embodiments audio/voice inputs can be used to interact with the user interface or computer-generated environment captured by one or more audio sensors (e.g., microphones). Further, as described above, it should be understood that the described electronic device, display and touch-sensitive surface and/or other input devices/sensors are optionally distributed amongst two or more devices.

The electronic device typically supports a variety of applications that may be displayed in the computer-generated environment, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a content application (e.g., a photo/video management application), a digital camera application, a digital video camera application, a web browsing application, a digital music player application, a television channel browsing application, and/or a digital video player application.

FIG. 1 illustrates an example electronic device 100 displaying a 3D computer-generated environment according to some embodiments of the disclosure. In some embodiments, electronic device 100 is a hand-held or mobile device, such as a tablet computer, laptop computer, smartphone, a wearable device, or head-mounted display. Examples of device 100 are described below with reference to the architecture block diagram of FIG. 2. As shown in FIG. 1, electronic device 100 and table 120 are located in the physical environment 110. In some embodiments, electronic device 100 may be configured to capture areas of physical environment 110 including table 120 (illustrated in the field of view of electronic device 100). In some embodiments, in response to a trigger, the electronic device 100 may be configured to display an object 130 in the computer-generated environment (e.g., represented by a cube illustrated in FIG. 1) that is not present in the physical environment 110 (e.g., a virtual object), but is displayed in the computer-generated environment positioned on (e.g., anchored to) the top of a computer-generated representation 120' of real-world table 120. For example, object 130 can be displayed on the surface of the table 120' in the computer-generated environment displayed via device 100 in response to detecting the planar surface of table 120 in the physical environment 110. It should be understood that object 130 is a representative object and one or more different objects (e.g., of various dimensionality such as two-dimensional or three-dimensional objects) can be included and rendered in a three-dimensional computer-generated environment. For example, the object can represent an application or a user interface displayed in the computer-generated environment. In some examples, the application or user interface can include the display of selectable options for launching applications or for performing operations associated with applications. Additionally, it should be understood, that the three-dimensional (3D) environment (or 3D object) described herein may be a representation of a 3D environment (or three-dimensional object) displayed in a two dimensional (2D) context (e.g., displayed on a 2D screen).

Figure 2:
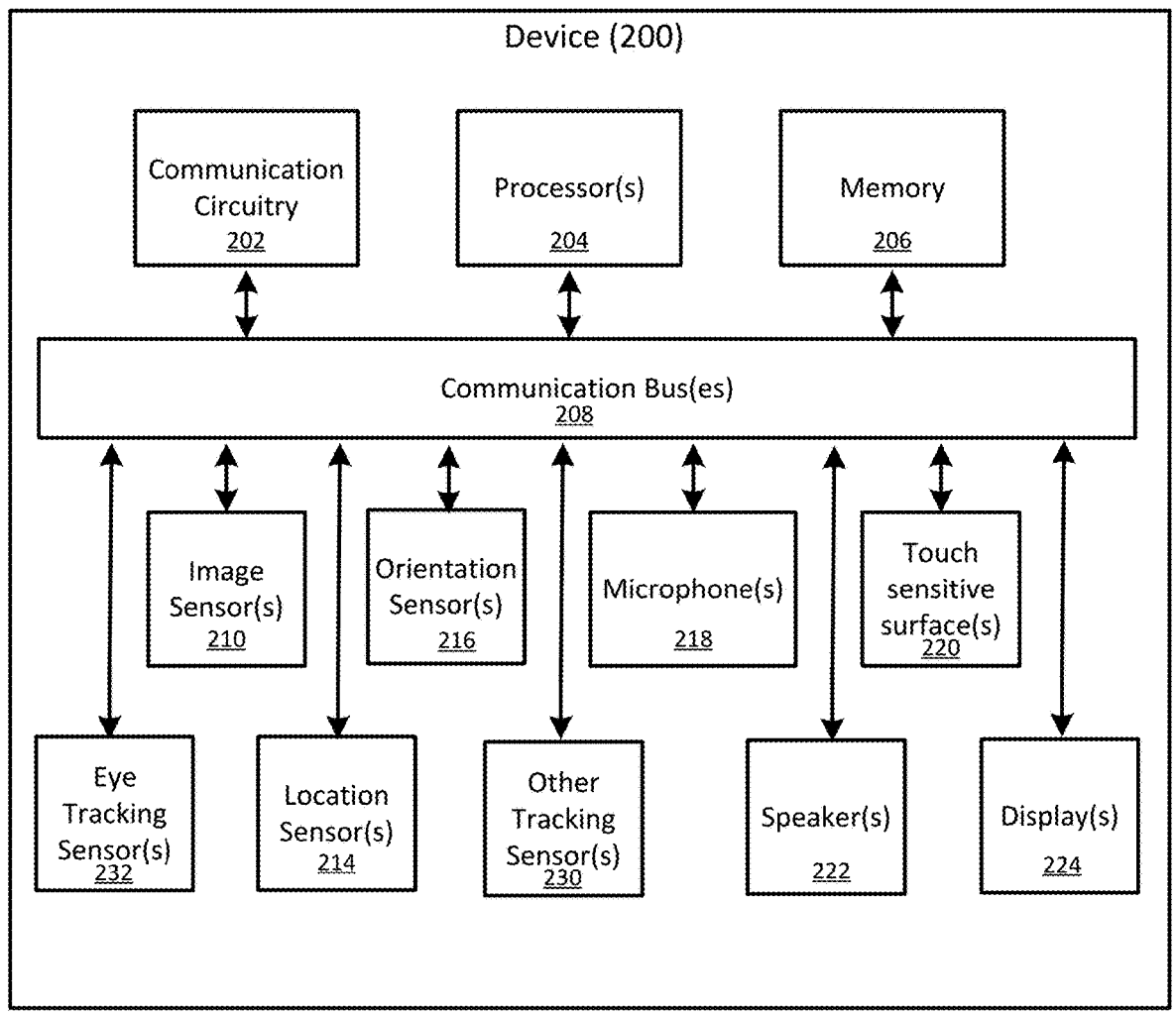
FIG. 2 illustrates an example block diagram of an exemplary architecture for a device in accordance with some embodiments of the disclosure.

FIG. 2 illustrates an example block diagram of an exemplary architecture for a device 200 in accordance with some embodiments of the disclosure. The blocks in FIG. 2 can represent an information processing apparatus for use in the device. In some embodiments, device 200 is a mobile device, such as a mobile phone (e.g., smart phone), a tablet computer, a laptop computer, a desktop computer, a wearable device, a head-mounted display, an auxiliary device in communication with another device, etc. In some embodiments, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, display generation component(s) 224, tracking sensor(s) 230, and/or eye tracking sensor(s) 232. These components optionally communicate over communication bus(es) 208 of device 200.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication (NFC) and/or short-range communication, such as Bluetooth®.

Processor(s) 204 include one or more general processors, one or more graphics processors, and/or one or more digital signal processors. In some embodiments, memory 206 a non-transitory computer-readable storage medium (e.g., flash memory, random access memory, or other volatile or non-volatile memory or storage) that stores computer-readable instructions configured to be executed by processor(s) 204 to perform the techniques, processes, and/or methods described below. In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display generation component(s) 224. In some embodiments, display generation component(s) 224 include a single display (e.g., a liquid-crystal display (LCD), organic light-emitting diode (OLED), or other types of display). In some embodiments, display generation component(s) 224 includes multiple displays. In some embodiments, display generation component(s) 224 can include a display with touch capability (e.g., a touch screen), a projector, a holographic projector, a retinal projector, etc. In some embodiments, device 200 includes touch-sensitive surface(s) 220 for receiving user inputs, such as tap inputs and swipe inputs or other gestures. In some embodiments, display generation component(s) 224 and touch-sensitive surface(s) 220 form touch-sensitive display(s) (e.g., a touch screen integrated with device 200 or external to device 200 that is in communication with device 200).

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the real-world environment. Image sensor(s) 210 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 210 also optionally include one or more cameras configured to capture movement of physical objects in the real-world environment. Image sensor(s) 210 also optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 220 include a first image sensor and a second image sensor. The first image sensor and the second image sensor work in tandem and are optionally configured to capture different information of physical objects in the real-world environment. In some embodiments, the first image sensor is a visible light image sensor and the second image sensor is a depth sensor. In some embodiments, device 200 uses image sensor(s) 210 to detect the position and orientation of device 200 and/or display generation component(s) 224 in the real-world environment. For example, device 200 uses image sensor(s) 210 to track the position and orientation of display generation component(s) 224 relative to one or more fixed objects in the real-world environment.

In some embodiments, device 200 includes microphones(s) 218 or other audio sensors. Device 200 uses microphone(s) 218 to detect sound from the user and/or the real-world environment of the user. In some embodiments, microphone(s) 218 includes an array of microphones (a plurality of microphones) that optionally operate in tandem, such as to identify ambient noise or to locate the source of sound in space of the real-world environment.

Device 200 includes location sensor(s) 214 for detecting a location of device 200 and/or display generation component(s) 224. For example, location sensor(s) 214 can include a GPS receiver that receives data from one or more satellites and allows device 200 to determine the device's absolute position in the physical world.

Device 200 includes orientation sensor(s) 216 for detecting orientation and/or movement of device 200 and/or display generation component(s) 224. For example, device 200 uses orientation sensor(s) 216 to track changes in the position and/or orientation of device 200 and/or display generation component(s) 224, such as with respect to physical objects in the real-world environment. Orientation sensor(s) 216 optionally include one or more gyroscopes and/or one or more accelerometers.

Device 200 includes eye tracking sensor(s) 232 and/or other tracking sensor(s) 230, in some embodiments. Tracking sensor(s) 230 include, but are not limited to, one or more of hand tracking sensors, body tracking sensors, and face tracking sensors, are configured to track the position/location of one or more portions of the user's hands, body or face, and/or motions of one or more portions of the user's hands, body or face with respect to the computer-generated environment, relative to the display generation component(s) 224, and/or relative to another defined coordinate system. Eye tracking sensor(s) 232 are configured to track the position and movement of a user's gaze (eyes, face, or head, more generally) with respect to the real-world or computer-generated environment and/or relative to the display generation component(s) 224. In some embodiments, tracking sensor(s) 230 and/or eye tracking sensor(s) 232 are implemented together with the display generation component(s) 224.

In some embodiments, the tracking sensor(s) 230 can use image sensor(s) 210 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some embodiments, one or more image sensor(s) 210 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it does not require the user to touch, hold or wear any sort of beacon, sensor, or other marker.

In some embodiments, eye tracking sensor(s) 232 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s). In some embodiments, eye tracking sensor(s) 232 can use image sensor(s) 210 (e.g., one or more IR cameras, 3D cameras, depth cameras, etc.).

Device 200 is not limited to the components and configuration of FIG. 2, but can include fewer, other, or additional components in multiple configurations. A person using device 200, is optionally referred to herein as a user of the device.

As described herein, a computer-generated environment including various graphical user interfaces ("GUIs") may be displayed using an electronic device, such as electronic device 100 or device 200, including one or more display generation components. The computer-generated environment can include one or more GUIs associated with an application or program. For example, a user can launch a web browser and cause a browser window to be presented in the computer-generated environment so that the user can access the Internet from within the 3D computer-generated environment.

Figure 3A:
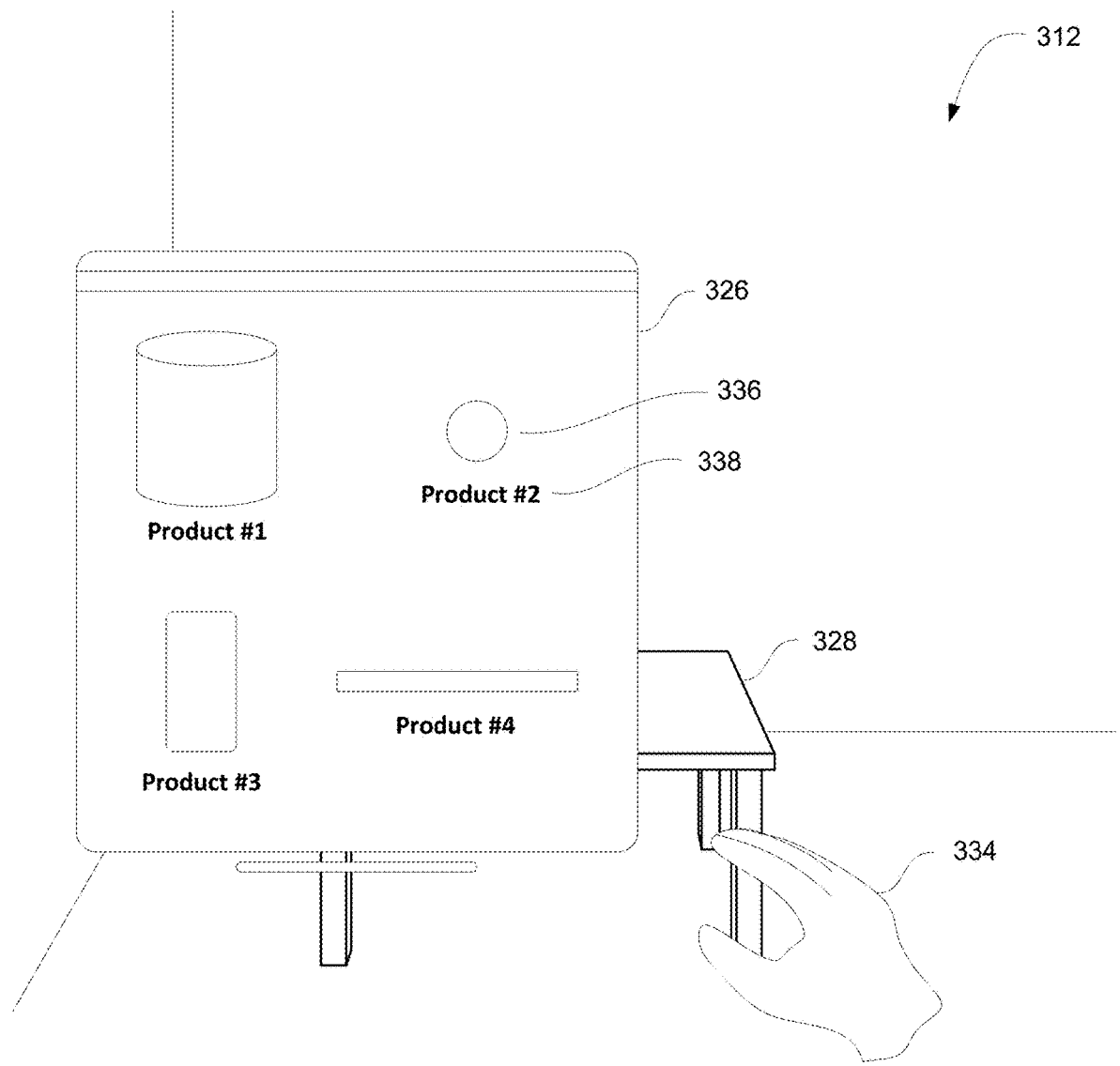
FIG. 3A illustrates an example window presented in a 3D computer-generated environment according to some embodiments of the disclosure.

FIG. 3A illustrates example window 326 presented in 3D computer-generated environment 312 according to some embodiments of the disclosure. In the example of FIG. 3A, an electronic device (similar to electronic device 100 or 200 described above) can present 3D computer-generated environment 312 with a particular scale. For example, if 3D computer-generated environment 312 appears to be an actual size, life-like (e.g., full size) environment, the environment can be considered to be presented with a scale of 1:1.

For purposes of this disclosure, 3D computer-generated environment 312 shown in FIG. 3A (and other figures referred to in this disclosure) will be described in the context of a rectangular x-y-z coordinate system, with the origin of the rectangular coordinate system assigned to the back-left corner of the environment (hidden in FIG. 3A). Accordingly, left-to-right movement can be referred to as movement in the +x direction, right-to-left movement can be referred to as movement in the −x direction, front-to-back movement can be referred to as movement in the −y direction, back-to-front movement can be referred to as movement in the +y direction, lower-to-higher movement can be referred to as movement in the +z direction, higher-to-lower movement can be referred to as movement in the −z direction.

3D computer-generated environment 312 can include representations of objects that are in the physical environment around the electronic device (e.g., objects that are captured by one or more cameras of the electronic device or are viewable to the user via a transparent or translucent display). In the embodiment of FIG. 3A, table 328 is shown in 3D computer-generated environment 312 as a representative example of one or more objects in the physical world around the electronic device that have been captured by one or more capture devices of the electronic device and presented in 3D within the environment. For purposes of explaining the scale of objects as used herein, if table 328 appears to be an actual size, life-like (e.g., full size) table within and with respect to 3D computer-generated environment 312, it can be considered to be presented with a 1:1 scale with respect to the scale of the 3D computer-generated environment, regardless of the presented scale of the environment. On the other hand, if the size of table 328 is modified to appear half of its actual size in 3D computer-generated environment 312, it can be considered to be presented with a 0.5:1 scale with respect to the scale of the 3D computer-generated environment, regardless of the presented scale of the environment.

In the example embodiment of FIG. 3A, computer-generated environment 312 also includes representation 334 of a hand of a user of the electronic device that is present in the physical environment around the electronic device and has been captured by one or more capture devices of the electronic device. For example, the electronic device can capture an image of the hand of the user using one or more cameras of the electronic device, identify a pose of the hand, and assign and present a corresponding pose of the hand as representation 334 in 3D computer-generated environment 312. In some examples, representation 334 can be a photorealistic depiction of the hand of the user or a caricature or outline of the hand of the user. In other examples, representation 334 can be an image of the actual hand of the user that is passively presented in computer-generated environment 312 by the electronic device via a transparent or translucent display. The electronic device can permit the image of the passively presented user's hand to be viewable, for example, by not actively displaying a virtual object that obscures the view of the hand. In other examples, representation 334 can be a representation of other real objects (e.g., a stylus, a wand, etc.) in the physical environment around the electronic device, or a representation of a virtual object that is not present in the physical environment, but nevertheless serves as a representation of a user input. Therefore, although representation 334 may be illustrated and described throughout this disclosure as a representation of a hand, it should be understood that representation 334 can refer to a representation of a hand or other object, and can refer to either a virtual representation of a physical object presented on a display, the physical object itself as passively provided by a transparent or translucent display, or a virtual object. Furthermore, although FIG. 3A illustrates representation 334 as a right hand, in other embodiments the representation can be a left hand.

In some examples, 3D computer-generated environment 312 can additionally or alternatively display one or more virtual object representations (e.g., object representations that are generated and displayed by the electronic device in the 3D computer-generated environment, but do not exist in the physical environment (e.g., real world environment) around the electronic device). Window 326 is shown in 3D computer-generated environment 312 as a representative example of a virtual object representation presented within the environment. In accordance with an instruction to open a window, such as the launching of a web browser, window 326 can be presented in 3D computer-generated environment 312. The instruction can be generated using any number of input mechanisms available to the user while operating the electronic device, which includes, but is not limited to, touch, audio, hand or eye gaze tracking, or other sensor inputs. In the example of FIG. 3A, window 326 is presented with an initial size that can be considered the default actual size and actual scale (1:1 scale) of the window within, and with respect to, the presented size and scale of 3D computer-generated environment 312, and at a particular depth within the environment. Although window 326 is described and illustrated primarily as a rectangular web browser window, the term "window" as defined herein is inclusive of not only a web browser window, but also other bounded areas within the 3D computer-generated environment that are capable of presenting a layout of object representations. In some examples, a window can have any regular or irregular shape, and can be suspended in the 3D computer-generated environment, or superimposed or virtually projected onto virtual objects (e.g., virtual walls, ceilings or floors) or representations of physical objects, as long as the window is capable of being relocated and resized within the environment. In some examples, the window can present all or a portion of an image (e.g., all or a portion of a virtual computing device screen or monitor, virtual television or virtual video feed, all or a portion of a nested computer-generated environment, or all or a portion of a photo, drawing, handheld virtual frame or other static image, etc.) containing multiple object representations.

In examples where window 326 is a web browser window, the user can operate the web browser from within 3D computer-generated environment 312 to visit various websites and perform activities that would otherwise be available to a user when accessing a conventional web browser through a conventional computing device. In the example of FIG. 3A, a website within window 326 is presenting different images which, as defined herein, are inclusive of object representations 336 (e.g., representations of 2D or 3D objects, models or images of products available for inspection and/or purchase), and object text 338 (e.g., product information, descriptors, identifiers, etc.) associated with those object representations. In some embodiments, object representations 336 can be presented at their actual size (their correct physical size or full size within and with respect to the presented size of 3D computer-generated environment 312) and at their actual scale (1:1 scale) relative to each other and with respect to the presented scale of the environment. Accordingly, object representations 336 can have a displayed size (e.g., the size of the object representations as they appear to the user) that is appropriate for their perceived distances from the user. As used herein, object representations 336 refer generally to all representations of 2D or 3D objects, models or images in window 326 (e.g., the representations of Product #1, Product #2, Product #3, and Product #4), and object text 338 refers generally to all text associated with all object representations in the window (e.g., the text "Product #1," "Product #2," "Product #3," and "Product #4"). It should be understood that although the figures and disclosure may refer to an online shopping application with products available for inspection and purchase, embodiments of the disclosure are not so limited, and are inclusive of any window, image or user interface with multiple displayed object representations that can be viewed for any purpose. Accordingly, the term "object representations" as defined herein is inclusive of not only products available for purchase in an online shopping application viewed through a web browser window, but also other objects presented within any other type of window described above, including any type of inanimate object, animate object (e.g., humans, animals, plants, etc.) or other representations capable of being presented in a window with their actual size and at their actual scale relative to each other and with respect to the presented size and scale of the 3D computer-generated environment, and with a displayed size appropriate for their perceived distances from the user.

Figure 3B:
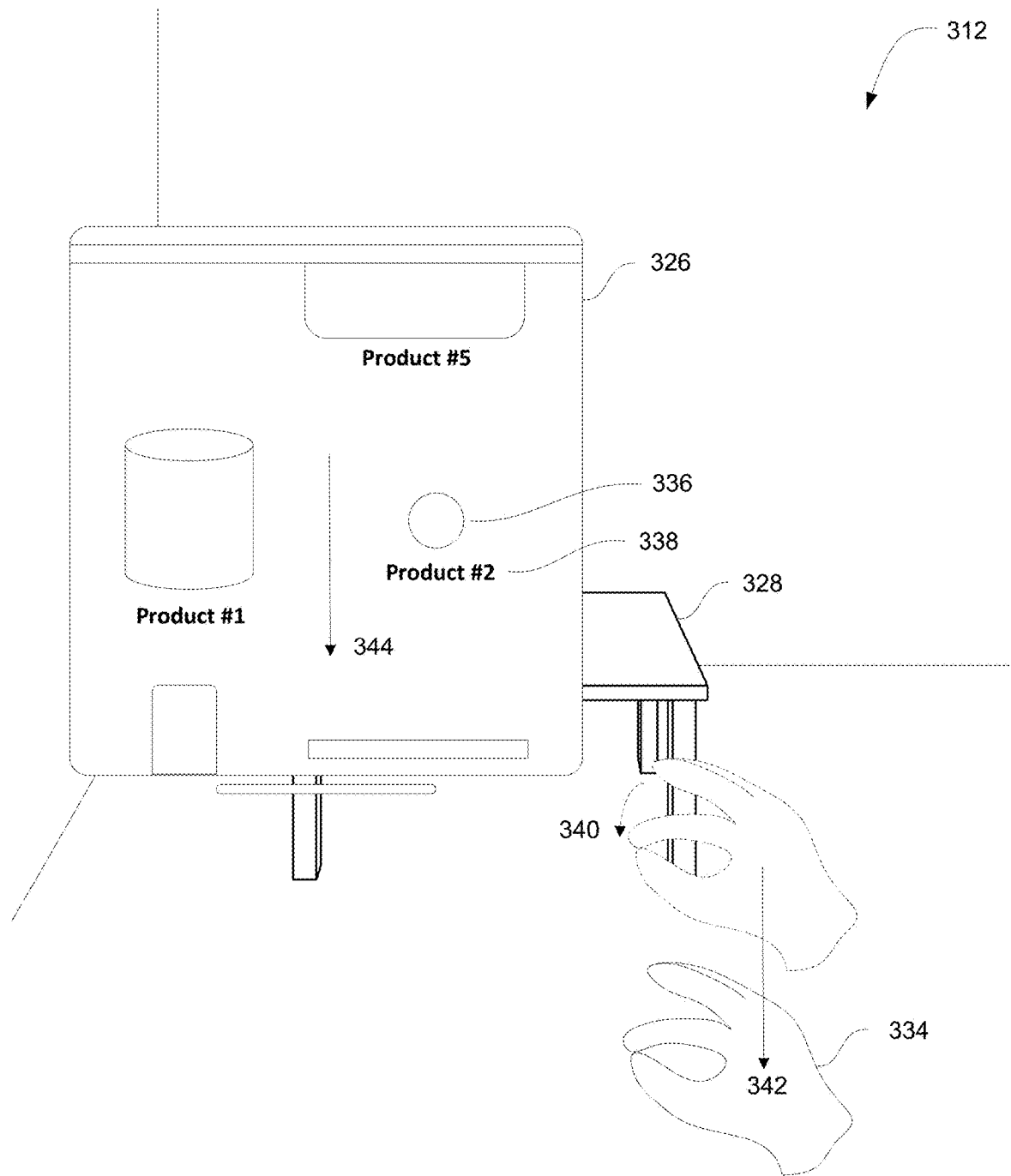
FIG. 3B illustrates example object representations and object text in a window being scrolled downward in a 3D computer-generated environment according to some embodiments of the disclosure.

FIG. 3B illustrates example object representations 336 and object text 338 in window 326 being scrolled downward in 3D computer-generated environment 312 according to some embodiments of the disclosure. In the example of FIG. 3B, which is a continuation of the example of FIG. 3A, a user can perform a gesture in the physical environment that is recognizable by the electronic device, such as a thumb-index finger pinch (and hold) gesture performed within a certain perceived distance from window 326. This gesture, when recognized, can be mimicked by gesture 340 from representation 334 in 3D computer generated environment 312. While holding the pinch, the user's hand can then be moved downward in the −z direction in the physical environment, which can once again be mimicked by representation 334 in 3D computer-generated environment 312 as shown at 342. To recognize and perform this combined pinch-hold-swipe gesture, the electronic device may track changes to the pose of the physical object (e.g., the pinching of two fingers of the user's hand) and track movement of the physical object (e.g., downward movement of the hand) in the physical environment, and cause representation 334 to similarly change its pose and movement in 3D computer-generated environment 312. Upon recognizing this pinch-hold-swipe gesture as satisfying the criteria for a window selection gesture or command, satisfying the criteria for selecting window 326, and satisfying the criteria for a window scrolling gesture or command, the electronic device can perform a window scrolling operation and scroll object representations 336 and object text 338 in window 326 as shown at 344. The amount, speed, and acceleration of the object representation scrolling can be a function of the detected distance, speed, and/or acceleration of downward swipe 342.

As a result of the scrolling, some object representations can begin to disappear from window 326, while other object representations (e.g., Product #5) can begin to appear in the window. As further object representations appear in window 326 as a result of scrolling, they can be made available to the user for inspection, and in the case of an online store, for purchase. The presentation of object representations at their actual size and scale relative to each other and with respect to the size and scale of the presented 3D computer-generated environment 312, and with a displayed size appropriate for their perceived distances from the user, can provide a more authentic, accurate and easier viewing experience and can encourage increased user interaction. For example, in online shopping, proper object scale and size can allow a user to make more informed decisions about the relative size, functionality and practicality of various products, and therefore make more informed purchasing decisions.

Although FIG. 3B shows a pinch-hold-swipe gesture, in other examples different interactions or gestures can also result in window selection and scrolling. For example, instead of a pinch, when representation 334 is determined to be within a threshold distance of window 326 (e.g., within 1 cm, 1 inch, etc. from the window (e.g., from an edge or centroid of the window)), the window can be selected, and an operation associated with the window can be initiated (e.g., a scrolling operation can be performed upon detection of subsequent movement of representation 334). To accomplish this, the electronic device may track the pose of the physical object in the physical environment and map the location of the pose to a location in a coordinate system in 3D computer-generated environment 312, such that a relative distance between representation 334 (corresponding to the physical object) and the virtual object representation (e.g., window 326) can be determined.

In another embodiment, a tap gesture can select window 326 for subsequent operations such as scrolling. To accomplish this, a fingertip of the user's hand in the physical environment can be detected and mapped to a location in a coordinate system in 3D computer-generated environment 312 within a predetermined distance from a virtual object representation (e.g., window 326), followed by the detection of the absence of the fingertip (beyond the predetermined distance) within a time limit (e.g., detection of a tap gesture) to select the virtual object representation. In the context of a 3D computer-generated environment such as that shown in FIG. 3B, window 326 can remain selected even after the selection input is no longer maintained (e.g., the fingertip (or other digit) of representation 334 is removed), and the tap gesture is completed. In other embodiments, instead of a gesture, a user can make a window selection request and a window scrolling request via other input methods and/or mechanisms, and upon recognition of these requests by the electronic device, the scrolling shown in FIG. 3B can be performed.

Figure 3C:
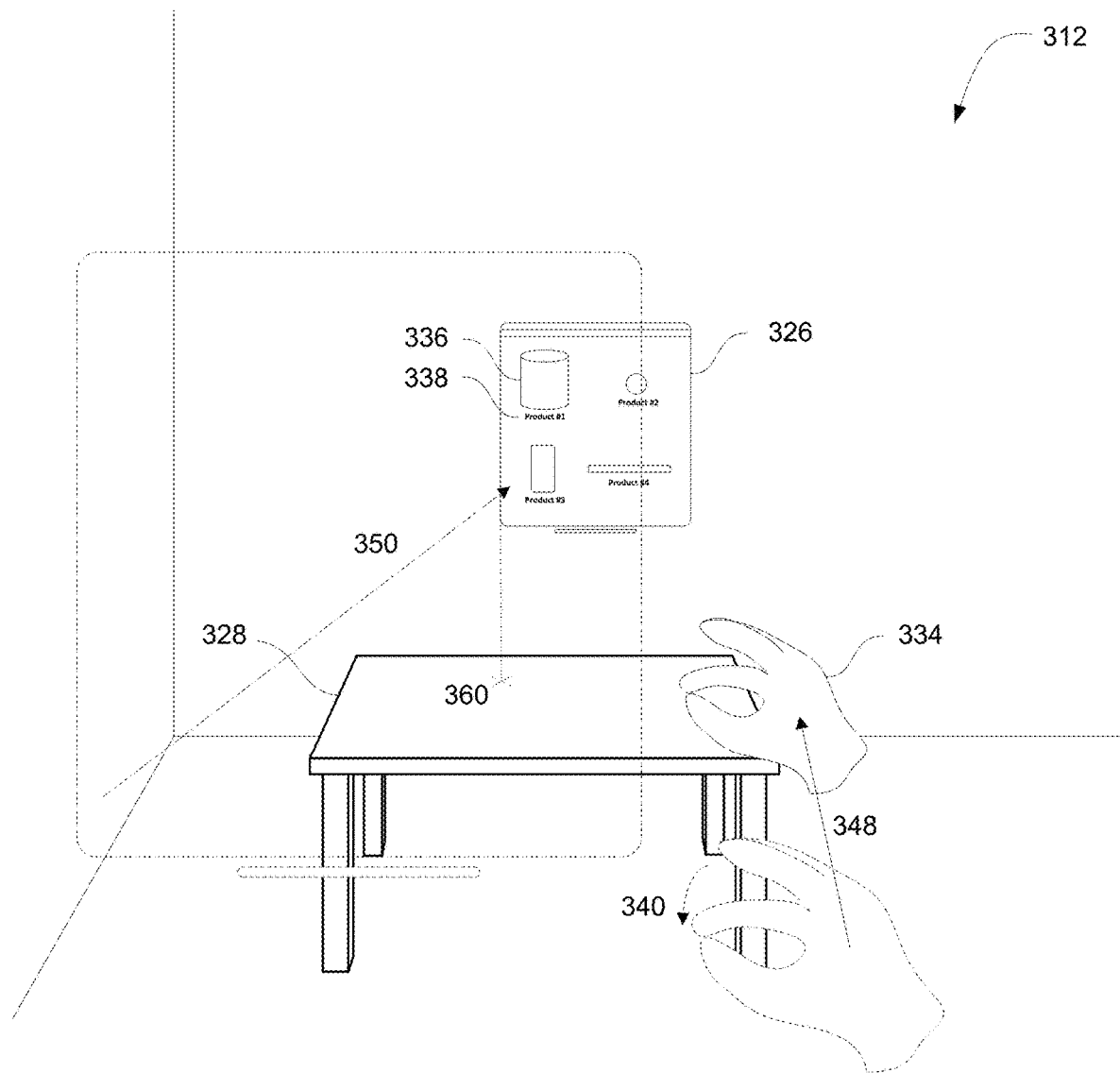
FIG. 3C illustrates an example window being moved backwards from its previous location closer to the user (indicated by a dashed outline) to a new location farther from the user in a 3D computer generated environment according to some embodiments of the disclosure.

FIG. 3C illustrates an example window 326 being moved backwards as indicated by arrow 350 from its previous location closer to the user (indicated by a dashed outline) to a new location farther from the user in 3D computer generated environment 312 according to some embodiments of the disclosure. The depth of window 326 is indicated by marker 360, which shows the plane of window 326 being located towards the back of table 328. In the example of FIG. 3C, which is a continuation of the example of FIG. 3A, a user can perform a gesture in the physical environment that is recognizable by the electronic device, such as a thumb-index finger pinch (and hold) gesture 340 performed within a certain perceived distance from window 326 (at its pre-translation location indicated by the dashed lines in FIG. 3C). This selection gesture, when recognized, can be mimicked by representation 334 in 3D computer generated environment 312. While holding the pinch, the user's hand can then be moved away (in the −y direction) from the user in the physical environment, which can once again be mimicked by movement 348 of representation 334 in 3D computer generated environment 312. The detected hand movement, as indicated by movement 348 of representation 334, can cause window 326 to move backward within 3D computer-generated environment 312 as shown at 350. The amount of translation of window 326 can be a linear or nonlinear function of the detected distance of movement 348.

To recognize this combined pinch-hold-translate gesture and perform a window relocation operation, the electronic device may track changes to the pose of the user's hand (e.g., the pinching of two fingers of the user's hand) and track movement of the hand (e.g., away from the user) in the physical environment, and cause representation 334 to similarly change its pose and movement in 3D computer-generated environment 312. Upon recognizing this pinch-hold-translate gesture as satisfying the criteria for a window selection gesture or command, satisfying the criteria for selecting window 326, and satisfying the criteria for a window relocation gesture or command, the electronic device can perform a window relocation operation and relocate window 326 to a location farther away from the user in 3D computer-generated environment 312 as shown in FIG. 3C. The amount of backward translation of window 326 can be a function of the detected distance of movement 348 in the −y direction. However, it should be understood that this pinch-hold-translate gesture is just one example, and that other inputs and/or gestures such as hand proximity, a finger tap, or a gaze followed by translation can also be employed to perform a window relocation operation. For example, instead of a gesture, a user can make a window selection request and a window relocation request via other input methods and/or mechanisms, and upon recognition of these requests by the electronic device, the translation shown in FIG. 3C can be performed.

In the embodiment of FIG. 3C, window 326, and object representations 336 and object text 338 within the window, can be presented with their actual size and at their actual scale relative to each other and with respect to the presented size and scale of 3D computer-generated environment 312, and can have a displayed size appropriate for their perceived distances from the user. As a result of movement 350 away from the user, window 326, and object representations 336 and object text 338 in the window, appropriately shrink in displayed size while maintaining the same actual size and scale within and with respect to the presented size and scale of 3D computer-generated environment 312. However, as can be seen in FIG. 3C, window 326, and object representations 336 and object text 338 within the window, can become so small that object features can become difficult to see, and words can become difficult to read. Although shrinking object representations 336 and object text 338 as window 326 moves backwards in 3D computer-generated environment 312 so that their actual size and scale within and with respect to the environment is preserved can provide a more authentic and accurate user experience, the decreased observability and readability of the object representations and text can be detrimental to the overall experience and lead to decreased user interaction (e.g., fewer purchases in an online shopping context).

To avoid the problem of decreased observability and readability shown in FIG. 3C, some embodiments of the disclosure are directed to performing counter-scaling to compensate for the changing depth of windows in 3D computer-generated environment 312 and preserve the readability and usability of the windows. Counter-scaling, as defined herein, is the adjusting of the scale (and therefore the size) of an element (e.g., a window, object representation and/or text) with respect to the presented scale of 3D computer-generated environment 312 in a manner that is contrary to (e.g., inversely related or proportional to) the forward or backward (y-direction) movement of the element in the environment. For example, as window 326 is moved backward in 3D computer-generated environment 312 in the −y direction so that its perceived distance from the user (e.g., its depth) increases, its displayed size (the size of the window as it appears to the user) is expected to gradually decrease, even though its actual size in the environment has not changed. To compensate for this, counter-scaling can cause the scale (and therefore the size) of window 326 within and with respect to the presented scale and size of 3D computer-generated environment 312 to gradually increase (e.g., the scale of the window changes from a 1:1 actual scale to a 1.2:1 scale with respect to the presented scale of the environment) as the window is moved backward in the environment, even though the displayed size of the window may gradually decrease as it moves farther away from the user. Thus, even though the displayed size of window 326 may still appear smaller as it is moved backward, counter-scaling can prevent the window from appearing as small as it would have appeared without counter-scaling. In some examples, counter-scaling can be selected to match the expected decrease in size of the window so that no apparent change in the displayed size of the window occurs. The changing of the scale of window 326 due to counter-scaling can be a linear or non-linear function of the distance of movement 348 of representation 334 in FIG. 3C.

Figure 4A:
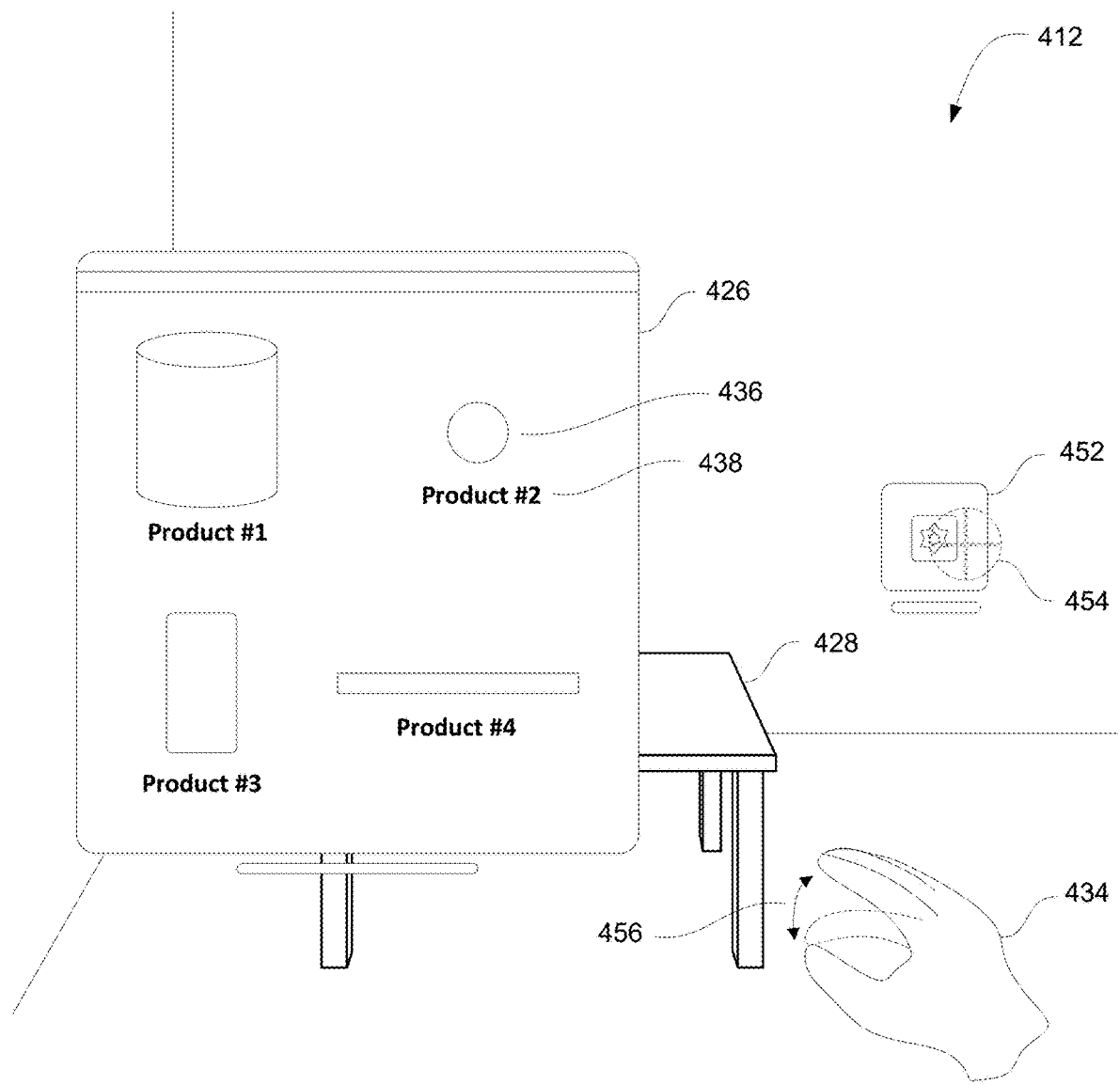
FIG. 4A illustrates utilizing an example control panel icon to call up a control panel to activate window counter-scaling and other features in a 3D computer-generated environment according to some embodiments of the disclosure.

FIG. 4A illustrates utilizing an example control panel icon 452 to call up a control panel to activate window counter-scaling and other features in 3D computer-generated environment 412 according to some embodiments of the disclosure. In the example of FIG. 4A, the user can direct gaze 454 at control panel icon 452, and when the gaze location is determined to be within an "element lock distance threshold" of icon 452 (e.g., within 1 cm, 1 inch, etc. from the icon (e.g., from an edge or centroid of the icon)), optionally for a certain period of time (e.g., an "element lock dwell time"), that icon is identified for potential selection. These aforementioned criteria are referred to herein as gaze location criteria. The user can then perform a pinch/release gesture 456 as indicated by representation 434 of the user's hand. To accomplish this, the electronic device may track changes to the pose of the physical object (e.g., the pinching and releasing of two fingers of the user's hand), and cause representation 434 to similarly change its pose and movement in 3D computer-generated environment 412. Upon recognizing this pinch/release gesture as a command to open a control panel, the electronic device can present the control panel. Note that control panel icon 452, gaze 454, and pinch/release gesture 456 are merely exemplary, and other methods of calling up and presenting a control panel can also be employed. For example, instead of a gesture, a user can make a control panel selection request via other input methods and/or mechanisms, and upon recognition of this request by the electronic device, a control panel can be presented.

Figure 4B:
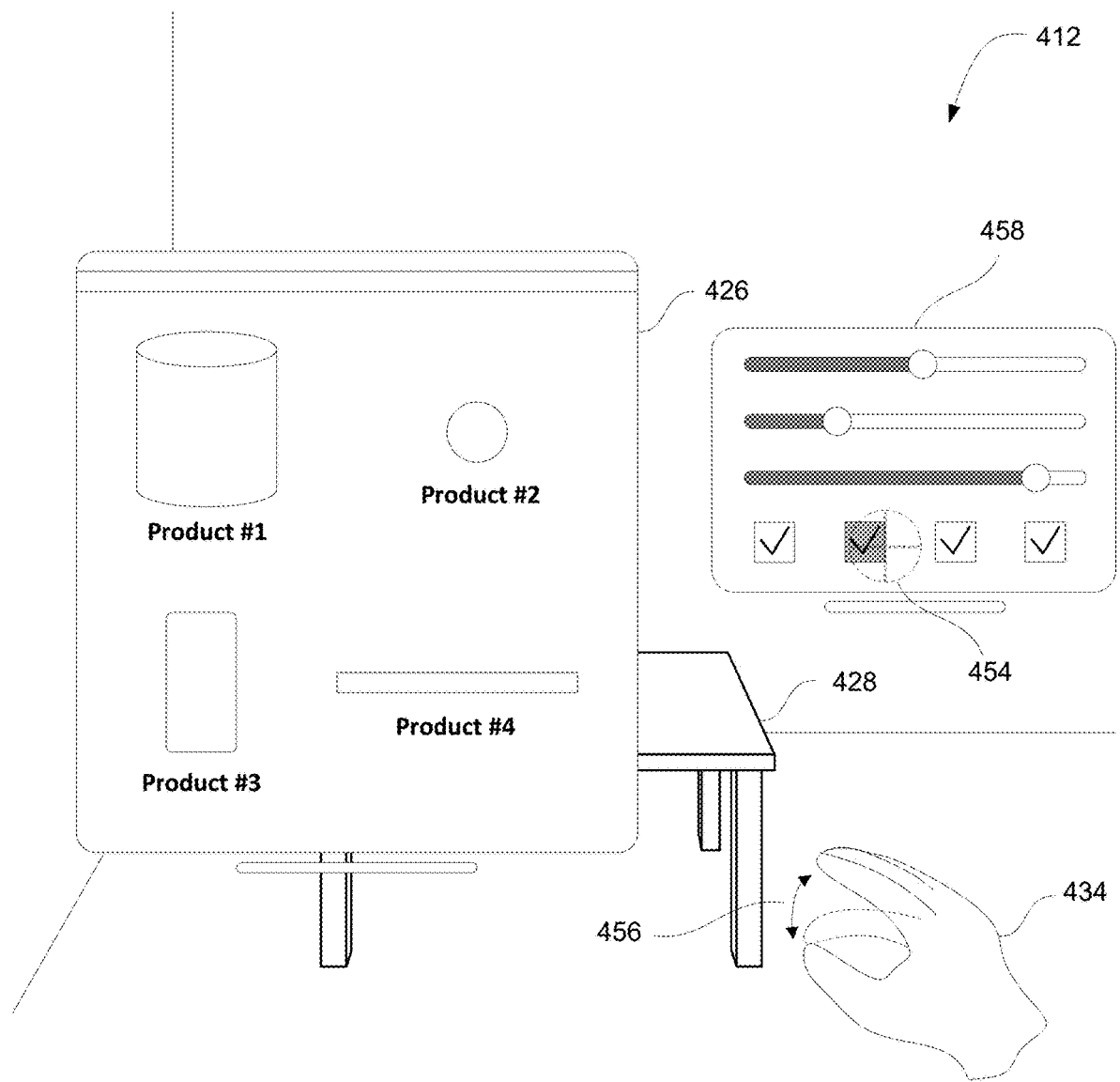
FIG. 4B illustrates an example control panel to activate counter-scaling and other features in a 3D computer-generated environment according to some embodiments of the disclosure.

FIG. 4B illustrates an example control panel to activate counter-scaling and other features in 3D computer-generated environment 412 according to some embodiments of the disclosure. FIG. 4B is a continuation of FIG. 4A, in which a control panel icon was selected to bring up control panel 458 shown in FIG. 4B. In the example of FIG. 4B, the user can direct gaze 454 at a counter-scaling button or other affordance on control panel 458, and while holding the gaze on the button or affordance, perform a pinch/release gesture 456 as indicated by representation 434 of the user's hand. Upon recognizing this pinch/release gesture as a command to toggle the counter-scaling button or affordance, the electronic device can activate counter-scaling in 3D computer-generated environment 412. In various embodiments, one or more of window counter-scaling, text counter-scaling, and object representation counter-scaling can be activated or deactivated using control panel 458. Note that control panel 458, gaze 454, and pinch/release gesture 456 are merely exemplary, and other methods of activating or deactivating counter-scaling can also be employed. For example, instead of a gesture, a user can make a counter-scaling request via other input methods and/or mechanisms, and upon recognition of this request by the electronic device, counter-scaling can be performed.

In some embodiments, the amount of counter-scaling of the window 426, object representations and/or object text can be a linear or nonlinear function of the movement of a window relocation gesture or command. In some embodiments the parameters of this function can be adjusted using control panel 458. In one embodiment, a user's gaze 454 can be located over a slider or other affordance, and a pinch/release gesture followed by a translation of representation 434 can adjust the counter-scaling function of the window, object representations and/or object text. Note, however, that control panel 458, gaze 454, and pinch/release gesture 456 are merely exemplary, and other methods of adjusting the counter-scaling function can also be employed. For example, instead of a gesture, a user can make a parameter adjustment request via other input methods and/or mechanisms, and upon recognition of this request by the electronic device, and the recognition of a subsequent adjustment input, parameter adjustment can be performed.

Figure 5A:
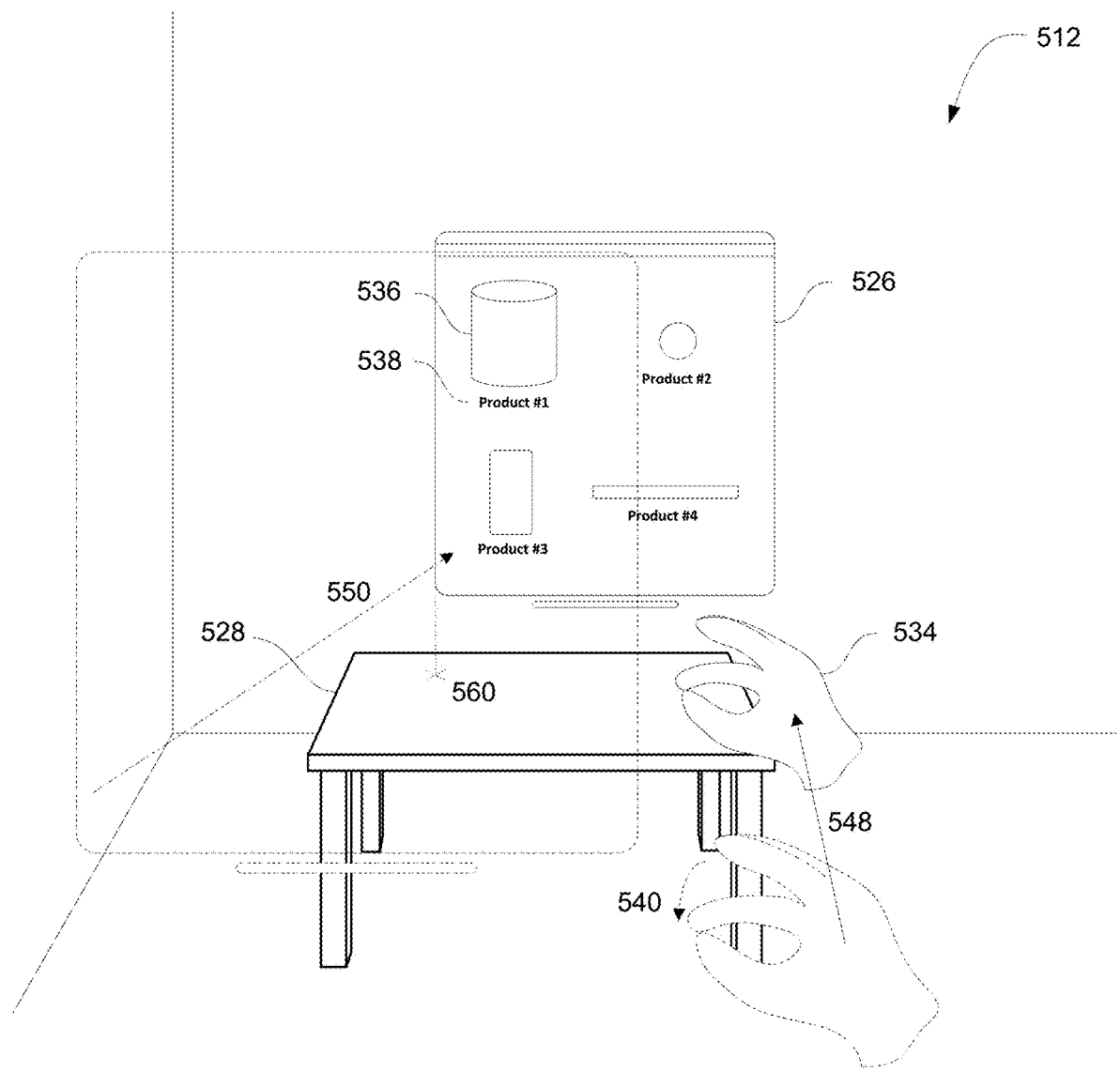
FIG. 5A illustrates an example window, object representation and text counter-scaling as the window is moved backwards from its previous location closer to the user (indicated by a dashed outline) to a new location farther from the user in a 3D computer generated environment according to some embodiments of the disclosure.

FIG. 5A illustrates example window, object representation and text counter-scaling as window 526 is moved backwards as indicated by arrow 550 from its previous location closer to the user (indicated by a dashed outline) to a new location farther from the user in 3D computer generated environment 512 according to some embodiments of the disclosure. The depth of window 526 (relative to the viewpoint of the user) is indicated by marker 560, which shows the plane of window 526 being located towards the back of table 528. In the example of FIG. 5A, a user can perform a gesture in the physical environment that is recognizable by the electronic device, such as a thumb-index finger pinch (and hold) gesture 540 performed within a certain distance from window 526 (at its pre-translation location indicated by the dashed lines in FIG. 5A). This gesture, when recognized, can be mimicked by representation 534 in 3D computer generated environment 512. While holding the pinch, the user's hand can then be moved away from the user in the physical environment, which can once again be mimicked by movement 548 of representation 534 in 3D computer generated environment 512. The detected hand movement, as indicated by movement 548 of representation 534, can cause window 526 to move backward within 3D computer-generated environment 512 as shown at 550. The amount of translation of window 526 can be a linear or nonlinear function of the detected distance of movement 548.

To recognize this combined pinch-hold-translate gesture and perform a window relocation operation, the electronic device may track changes to the pose of the user's hand (e.g., the pinching of two fingers of the user's hand) and track movement of the hand (e.g., away from the user) in the physical environment, and cause representation 534 to similarly change its pose and movement in 3D computer-generated environment 512. Upon recognizing this pinch-hold-translate gesture as satisfying the criteria for a window selection gesture or command, satisfying the criteria for selecting window 526, and satisfying the criteria for a window relocation gesture or command, the electronic device can perform a window relocation operation and relocate window 526 to a location farther away from the user in 3D computer-generated environment 512 as shown in FIG. 5A. The amount of backward translation of window 526 can be a function of the detected distance of movement 548. However, it should be understood that this pinch-hold-translate gesture is just one example, and that other inputs and/or gestures such as hand proximity, a finger tap, or a gaze followed by translation can also be employed to perform a window relocation operation. For example, instead of a gesture, a user can make a window selection request and a window relocation request via other input methods and/or mechanisms, and upon recognition of these requests by the electronic device, the translation shown in FIG. 5A can be performed.

In the embodiment of FIG. 5A, because window, object representation and object text counter-scaling have all been activated, window 526, object representations 536 and object text 538 are presented at a larger size and scale relative to their actual size and actual scale (e.g., 1:1 scale) within and with respect to the presented size and scale of 3D computer-generated environment 512, but with their correct scale relative to each other. To illustrate the effect of counter-scaling, although window 326 in FIG. 3C and window 526 in FIG. 5A are the same depth within 3D computer-generated environments 312 and 512, respectively, as indicated by markers 360 and 560, respectively, window 526 is larger in size than window 326 due to the effect of counter-scaling. Similarly, object representations 536 and object text 538 in FIG. 5A are larger in size than object representations 336 and object text 338 in FIG. 3C due to counter-scaling. The changing of the scale of window 526, object representations 536 and object text 538 due to counter-scaling can be a linear or nonlinear function of the detected distance of movement 548. In other embodiments, the amount of counter-scaling can be set or selected to completely offset the decreased field of view caused by the change in depth. In other words, the size of window 526 before the window relocation operation will be the same as the size of the window after the relocation.

Because window 526, object representations 536 and object text 538 in FIG. 5A are larger than their actual size counterparts in FIG. 3C, they can be more easily observed and read. On the one hand, increased observability and readability of object representations 536 and object text 538 can lead to increased user interaction (e.g., more purchases in an online shopping context). On the other hand, the larger than actual size of object representations 536 can leave a user with false impressions of the size, functionality and impracticality of an object, which can lead to decreased user interaction (e.g., fewer purchases in an online shopping context). This is less of a concern with two-dimensional (2D) object representations, where the user is more likely to understand that object representations are unrealistic and not accurate life-like representations of the objects. However, with the increased realism of 3D object representations, increased object size is more likely to leave the user with false negative impressions.

To avoid the problem of false impressions of object size shown in FIG. 5A, some embodiments of the disclosure are directed to preserving and protecting the actual size and scale of object representations and/or text as windows are moved backward or forward and counter-scaled in the 3D computer-generated environment.

Figure 5B:
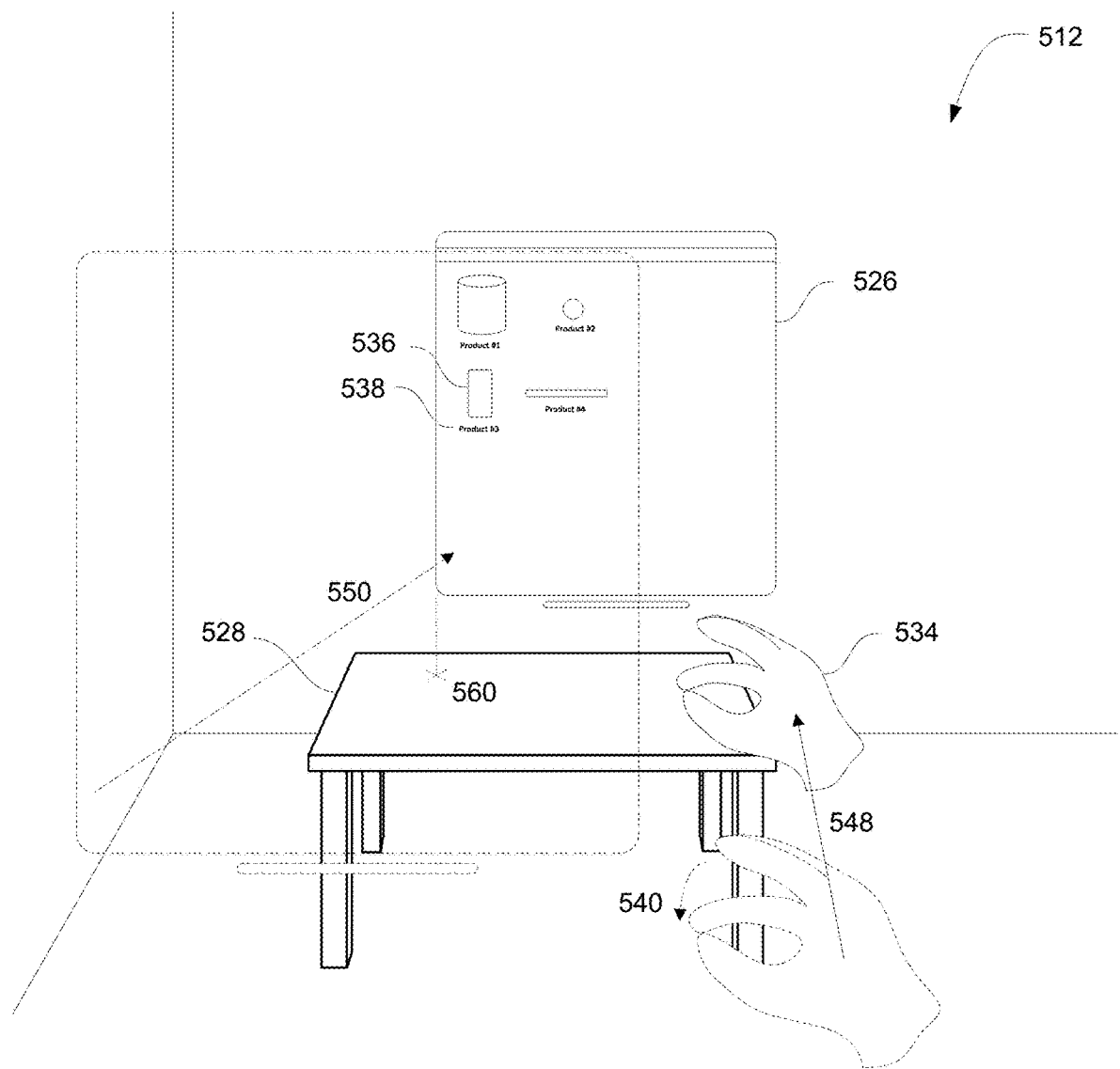
FIG. 5B illustrates example window counter-scaling as the window is moved backwards from its previous location closer to the user (indicated by a dashed outline) to a new location farther from the user in a 3D computer-generated environment according to some embodiments of the disclosure.

FIG. 5B illustrates example window counter-scaling as window 526 is moved backwards as indicated by arrow 550 from its previous location closer to the user (indicated by a dashed outline) to a new location farther from the user in 3D computer-generated environment 512 according to some embodiments of the disclosure. This relocating of window 526 farther away from the user in 3D computer-generated environment 512 can be performed in response to a pinch-hold-translate gesture or other gesture recognized as a window relocation gesture or command as described above in FIG. 5A. The amount of backward translation of window 526 and the counter-scaling of the window can be a linear or nonlinear function of the detected distance of movement 548. The example of FIG. 5B is similar to the example of FIG. 5A, except that in the embodiment of FIG. 5B only window counter-scaling has been activated, so the size and scale of window 526 has increased relative to its actual size and scale within and with respect to the presented size and scale of 3D computer-generated environment 512, while object representations 536 and object text 538 within the window are presented at their actual size and scale relative to each other and with respect to the environment. To illustrate the effect of counter-scaling, although window 326 in FIG. 3C and window 526 in FIG. 5B are at the same depth within 3D computer-generated environments 312 and 512, respectively, as indicated by markers 360 and 560, respectively, window 526 is presented at a larger scale and therefore is larger in size than window 326 due to the effect of counter-scaling. In some embodiments, window counter-scaling can occur incrementally and continuously as window 526 is being relocated to its new location farther from the user in FIG. 5B, such that the size and scale of window 526 gradually increases relative to its actual size and scale within and with respect to the presented size and scale of 3D computer-generated environment 512. In other embodiments, window counter-scaling can be delayed, then occur abruptly as window 526 completes relocation to its new location farther from the user in FIG. 5B, as indicated by a detected window relocation completion gesture, such as the releasing of pinched fingers.

Because object representations 536 and object text 538 continue to be presented at their actual size and scale relative to each other within and with respect to the presented size and scale of 3D computer-generated environment 512, and with a display size that is appropriate for their perceived distances from the user within the environment, a more authentic, accurate, and easier viewing experience can be provided. However, like FIG. 3C, object representations 536 and object text 538 can become so small that features can become difficult to see, and words can become difficult to read, and the decreased observability and readability of the object representations and text can be detrimental to the overall experience and lead to decreased user interaction (e.g., fewer purchases in an online shopping context). Furthermore, because window 526 has been counter-scaled to a larger scale and has become larger in size while object representations 536 and object text 538 have remained at their actual size and scale, the object representations and object text do not fill up the blank spaces in the window due to the increased window size, leaving unused blank space within the window.

To avoid the problem of unused blank space in window 526 as shown in FIG. 5B, some embodiments of the disclosure are directed to rearranging object representations 536 in the window as counter-scaling changes the window size.

Object representation rearrangement can be a user-configurable setting that can be activated or deactivated by the user using control panel 458 as shown in FIG. 4B, or via any other user input. In some examples, virtual buttons or other affordances on control panel 458 can toggle object representation rearrangement on or off, and virtual sliders or other affordances can adjust other parameters of object representation rearrangement (e.g., the percentage of blank space required before object representation rearrangement is actually performed).

Figure 5C:
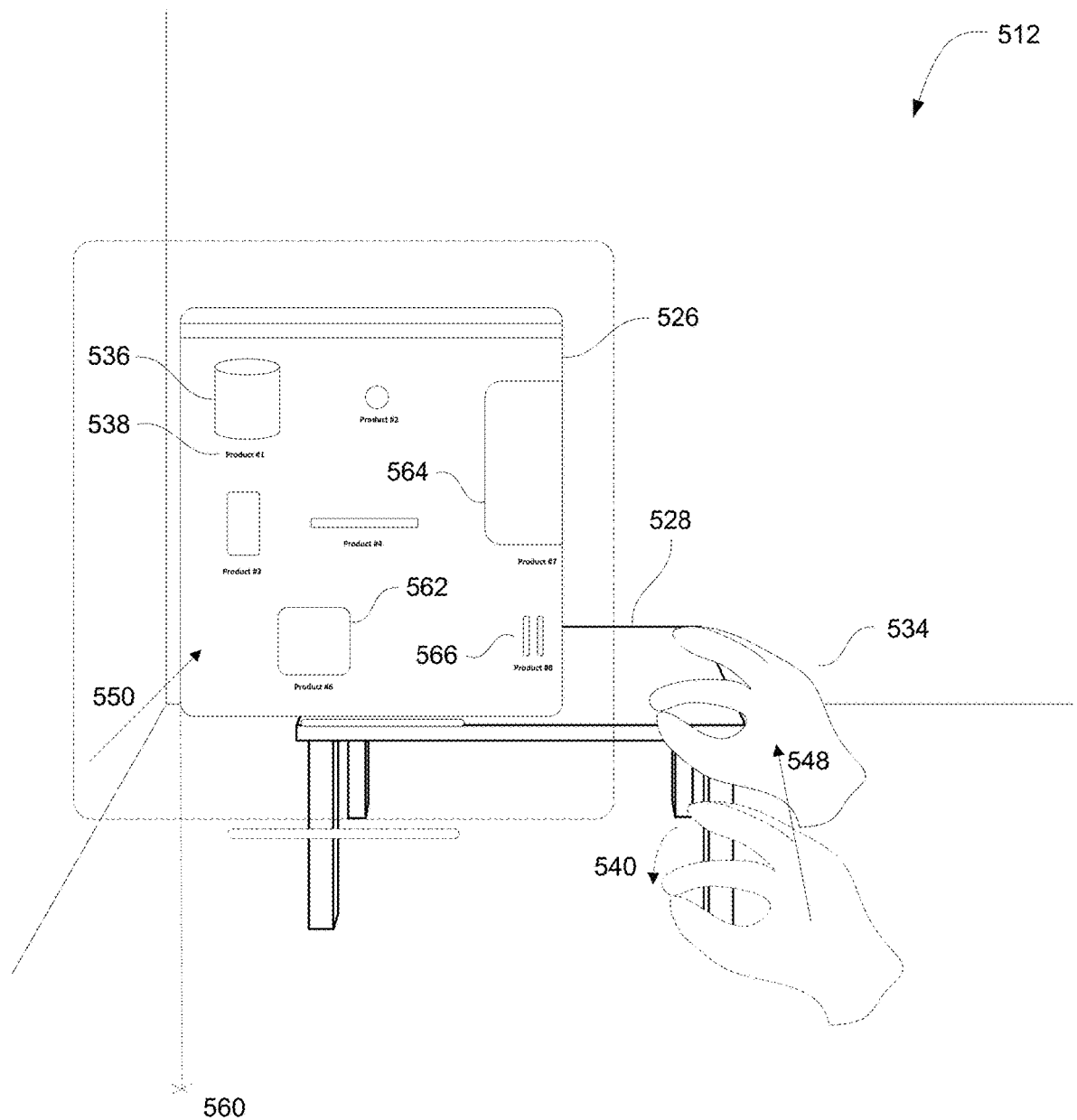
FIG. 5C illustrates window counter-scaling and object representation rearrangement as a window is moved to a new intermediate location farther from the user in a 3D computer generated environment according to some embodiments of the disclosure.

FIG. 5C illustrates window counter-scaling and object representation rearrangement as window 526 is moved to a new intermediate location farther from the user in 3D computer generated environment 512 according to some embodiments of the disclosure. This repositioning of window 526 farther away from the user in 3D computer-generated environment 512 can be performed in response to a pinch-hold-translate gesture or other gesture recognized as a window relocation gesture or command as described above in FIG. 5A. In the example of FIG. 5C, window 526 is moved backwards (from the perspective of the user) as indicated by arrow 550 from its original location closer to the user (indicated by a dashed outline) to a new intermediate location indicated by marker 560 in front of table 528. The amount of translation of window 526 and the counter-scaling of the window can be a linear or nonlinear function of the detected −y direction distance of movement 548. In FIG. 5C, window counter-scaling has been activated, so window 526 is larger relative to its actual size and scale within and with respect to the presented size and scale of 3D computer-generated environment 512, while object representations 536 and object text 538 within the window continue to be presented at their actual size and scale relative to each other and with respect to the environment.

Because window 526 has increased in size while object representations 536 and object text 538 have remained at their actual size, the object representations and object text originally appearing in window (see FIG. 3A) do not fill up the increased size of the window. However, because object representation rearrangement has been activated in the example of FIG. 5C, previously unseen object representations (e.g., object representations 562, 564 and 566) can begin to appear and fill in the otherwise unused blank space within window 526 to create a revised layout. As can be seen in FIG. 5C, object representations 536, 562, 564 and 566 and object text 538 are presented at their actual size and scale relative to each other within and with respect to the presented size and scale of 3D computer-generated environment 512, and with a display size that is appropriate for their perceived distances from the user. The amount of object representation rearrangement within window 526 can be a linear or nonlinear function of the increased window size, which is a function of the detected distance of movement 548.

Figure 5D:
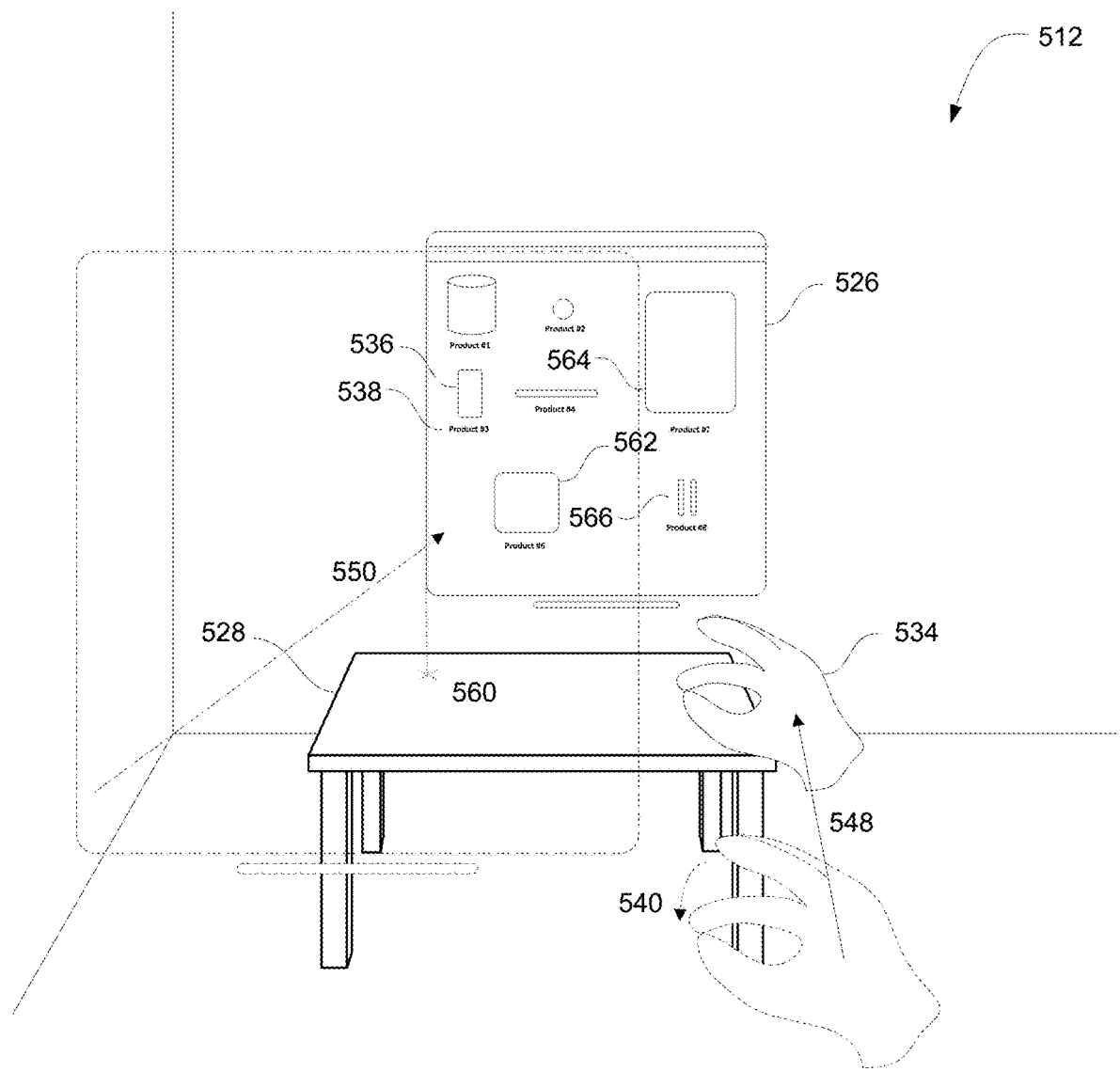
FIG. 5D illustrates window counter-scaling and object representation rearrangement as a window is moved to a new location farther from the user in a 3D computer generated environment according to some embodiments of the disclosure.

FIG. 5D illustrates window counter-scaling and object representation rearrangement as window 526 is moved to a new location farther from the user in 3D computer generated environment 512 according to some embodiments of the disclosure. This relocation of window 526 farther away from the user in 3D computer-generated environment 512 can be performed in response to a pinch-hold-translate gesture or other gesture recognized as a window relocation gesture or command as described above in FIG. 5A. In the example of FIG. 5D, window 526 is moved backwards with even more depth (from the perspective of the user) than in FIG. 5C as indicated by arrow 550 from its original location closer to the user (indicated by a dashed outline) to a new location in 3D computer-generated environment 512. In FIG. 5D, window 526 has now been moved backwards in 3D computer-generated environment 512 as much as in FIG. 5A, as indicated by marker 560, which shows the plane of the window being located towards the back of table 528. Because window counter-scaling has been activated, window 526 has increased in size (even more so than in FIG. 5C) relative to its actual size within 3D computer-generated environment 512, while object representations 536 and object text 538 within the window are presented at their actual size and scale relative to each other within and with respect to the environment, and with a display size appropriate for their perceived distances from the user.

Because window 526 has been counter-scaled while object representations 536 and object text 538 have remained at their actual size and scale, the object representations and object text originally appearing in window (see FIG. 3A) do not fill up the increased window size. However, because object representation rearrangement has been activated in the example of FIG. 5D, previously unseen object representations (e.g., object representations 562, 564 and 566) now fully appear (as compared to FIG. 5C, where they partially appear) and fill in the otherwise unused blank space within window 526 to create a further revised layout. As can be seen in FIG. 5D, object representations 536, 562, 564 and 566 and object text 538 are presented at their actual size and scale relative to each other within and with respect to the presented size and scale of 3D computer-generated environment 512, and with a display size that is appropriate for their perceived distances from the user, and can therefore provide a more authentic, accurate and easier user experience. Although FIGS. 5C and 5D illustrate an example of backward window relocation and object representation and object text rearrangement, it should be noted that embodiments of the disclosure encompass both forward and backward window relocation and corresponding object representation and object text rearrangement.

As illustrated in FIGS. 5C and 5D, a user is able to move window 526 backward (or forward) by any variable amount within 3D computer-generated environment 512. Counter-scaling can change the scale (and therefore the size) of window 526 in accordance with its depth within and with respect to the presented size and scale of 3D computer-generated environment 512, such that window size increases or decreases (as compared to its actual size) as the depth of the window increases or decreases. Regardless of the depth of window 526 in 3D computer-generated environment 512, object representations and object text within that window can be presented at their actual size and scale relative to each other within and with respect to the environment, with their displayed size appropriate for their perceived distances from the user. In addition, as the size of window 526 changes due to counter-scaling, object representations and object text can be rearranged (while maintaining their actual size) such that more or fewer object representations and object text appear in the window. Thus, a user can move window 526 backward or forward in 3D computer-generated environment 512 to present the window at a depth such that the displayed size and number of object representations and object text within the window are optimal for readability and user interaction, while preserving their proper scale and actual size within and with respect to the environment.

In some embodiments of the disclosure, object representation rearrangement as shown in FIGS. 5C and 5D can occur gradually and continuously, as movement 548 is incrementally detected. However, in other embodiments of the disclosure, object representation rearrangement can be delayed until the end of window translation. Delayed object representation rearrangement can be a user-configurable setting that can be activated or deactivated by the user using control panel 458 as shown in FIG. 4B, or via any other user input. In some examples, virtual buttons or other affordances on control panel 458 can toggle delayed object representation rearrangement on or off, and virtual sliders or other affordances can adjust other parameters of delayed object representation rearrangement.

Figure 5E:
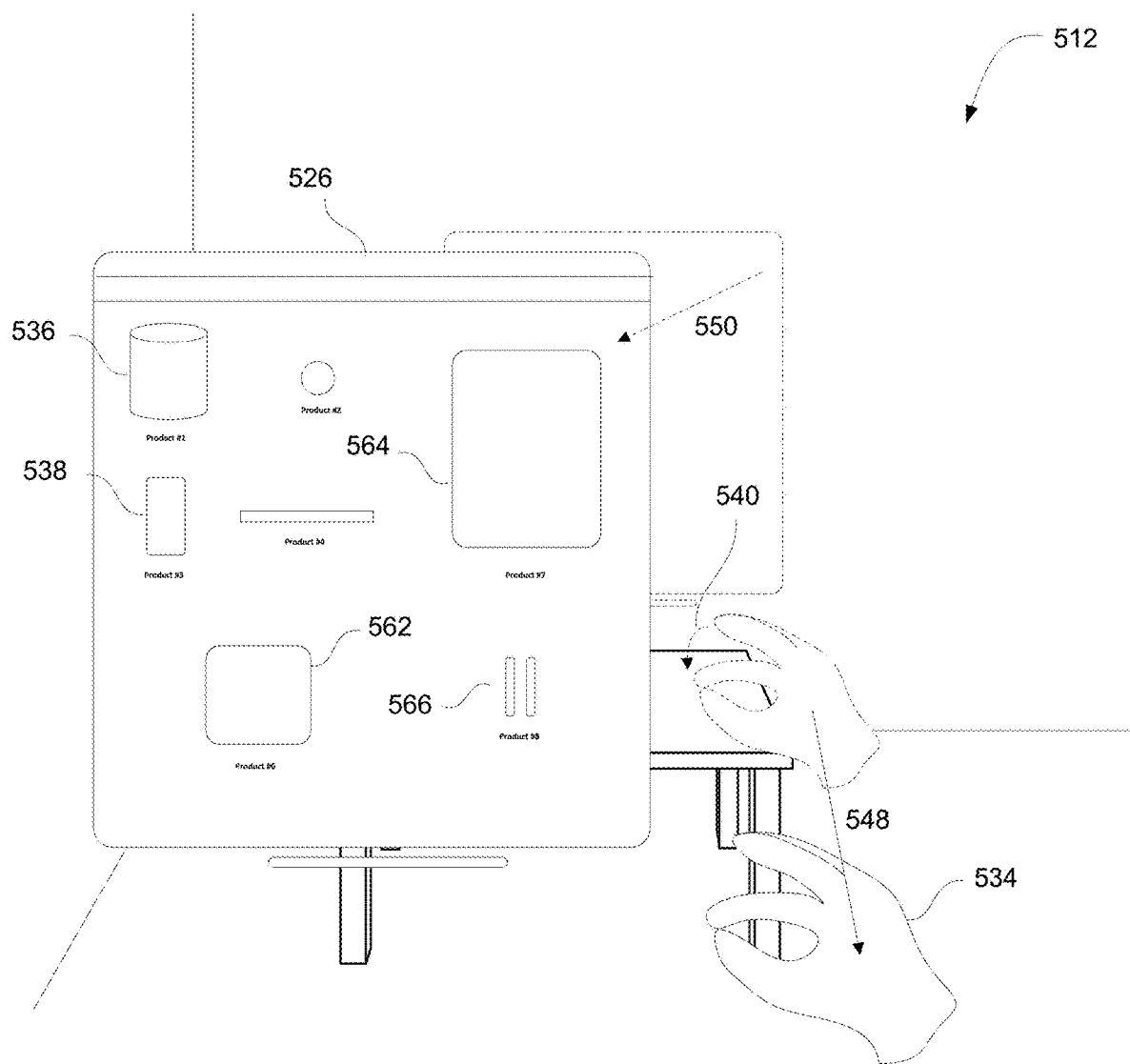
FIG. 5E illustrates window counter-scaling and delayed object representation rearrangement as a window is pulled forward in a 3D computer generated environment according to some embodiments of the disclosure.

FIG. 5E illustrates window counter-scaling and delayed object representation rearrangement as window 526 is pulled forward in 3D computer generated environment 512 according to some embodiments of the disclosure. This repositioning of window 526 closer to the user in 3D computer-generated environment 512 can be performed in response to a pinch-hold-translate gesture or other gesture recognized as a window relocation gesture or command as described above in FIG. 5A (except in the reverse direction). The example of FIG. 5E is a continuation of the example of FIG. 5D, where window 526 (presenting object representations 536, 562, 564 and 566 and object text 538) is now brought forward as indicated by arrow 550 from its previous location far from the user (indicated by a dashed outline) to a new location close to the user in 3D computer generated environment 512, in accordance with detected motion (e.g., hand motion) toward the user and corresponding movement 548 of representation 534. The amount of forward translation of window 526 can be a linear or nonlinear function of the detected distance of movement 548. In FIG. 5E, window counter-scaling has been activated, so the size of the window at its previous location (indicated in dashed lines) was larger relative to its actual size in 3D computer-generated environment 512, while object representations and object text within the window were presented with their actual size and correct scale relative to each other within and with respect to the environment. As window 526 moves closer to the user, counter-scaling causes the size of the window in 3D computer-generated environment 512 to become smaller, eventually returning to its original actual size at its original location 526 in the example of FIG. 5E, even though the displayed size of the window has increased because it has moved closer to the user.

In FIG. 5E, delayed object representation rearrangement has been activated. Because counter-scaling has caused window 526 to shrink back down to its actual size within 3D computer-generated environment 512 after being moved forward in FIG. 5E (though its displayed size has increased), object representations 536, 562, 564 and 566 and object text 538 also become smaller to maintain their present arrangement within the window. As a result, the object representations and object text are now temporarily presented with a size that is smaller than their actual size in 3D computer-generated environment 512. The preservation of the previous arrangement of object representations and object text may be held as long as the pose of the forward translation gesture (e.g., pinched fingers on representation 534) remains in place.

Figure 5F:
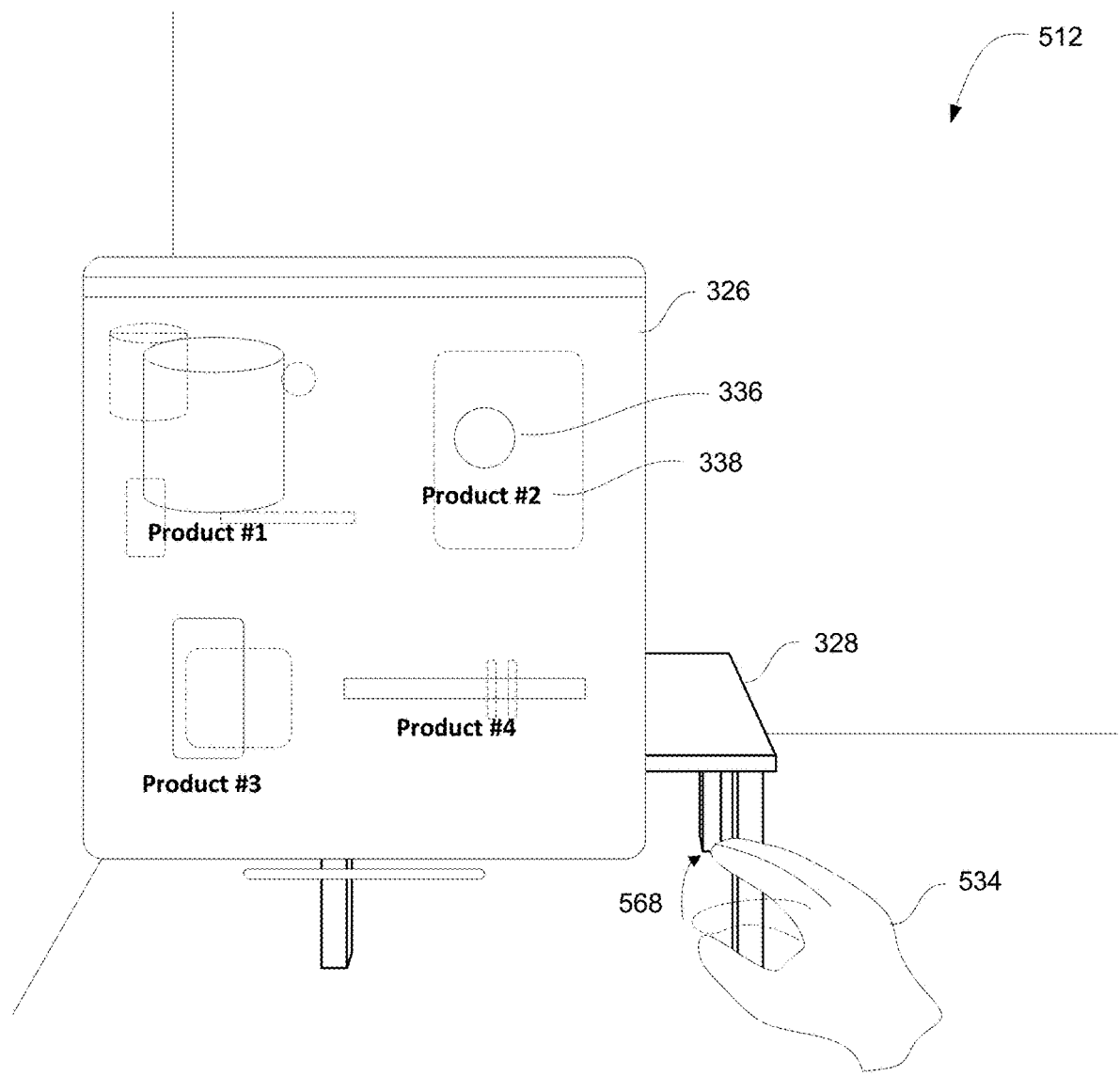
FIG. 5F illustrates an example completion of the delayed rearrangement of object representations and object text in a window presented in a 3D computer generated environment at the conclusion of a repositioning operation according to some embodiments of the disclosure.

FIG. 5F illustrates an example completion of the delayed object representation rearrangement of object representations 336 and object text 338 in window 526 presented in 3D computer generated environment 512 at the conclusion of a repositioning operation according to some embodiments of the disclosure. The example of FIG. 5F is a continuation of the example of FIG. 5E, where object representation rearrangement was not yet completed, so object representations 536, 562, 564 and 566 and object text 538 were presented in their previous arrangement with a size that is smaller than their actual size in 3D computer-generated environment 512 (see, e.g., dashed object outlines in FIG. 5F). In FIG. 5F, a user has completed a pinch-hold-translate gesture by releasing previously pinched fingers, and this releasing gesture has been detected by the electronic device and mimicked by movement 568 of representation 534 in 3D computer-generated environment 512. Upon detecting the releasing gesture as a window relocation completion gesture, the electronic device rearranges object representations 336 and object text 338 back to their original layout (see solid object outlines in FIG. 5F). As object representations 336 and object text 338 are returned to their original layout, their sizes also return to their actual sizes.

The examples illustrated in FIGS. 5B-5F and described above show object text 538 maintaining their actual size regardless of their depth in 3D computer-generated environment 512. However, when window 526 is located towards the back of 3D computer-generated environment 512, the displayed size of object text 538 can be so small that it becomes difficult or impossible to read, and therefore becomes of little or no use to the user. To address this issue, some embodiments of the disclosure provide for object text counter-scaling in a manner similar to window counter-scaling.

Figure 6A:
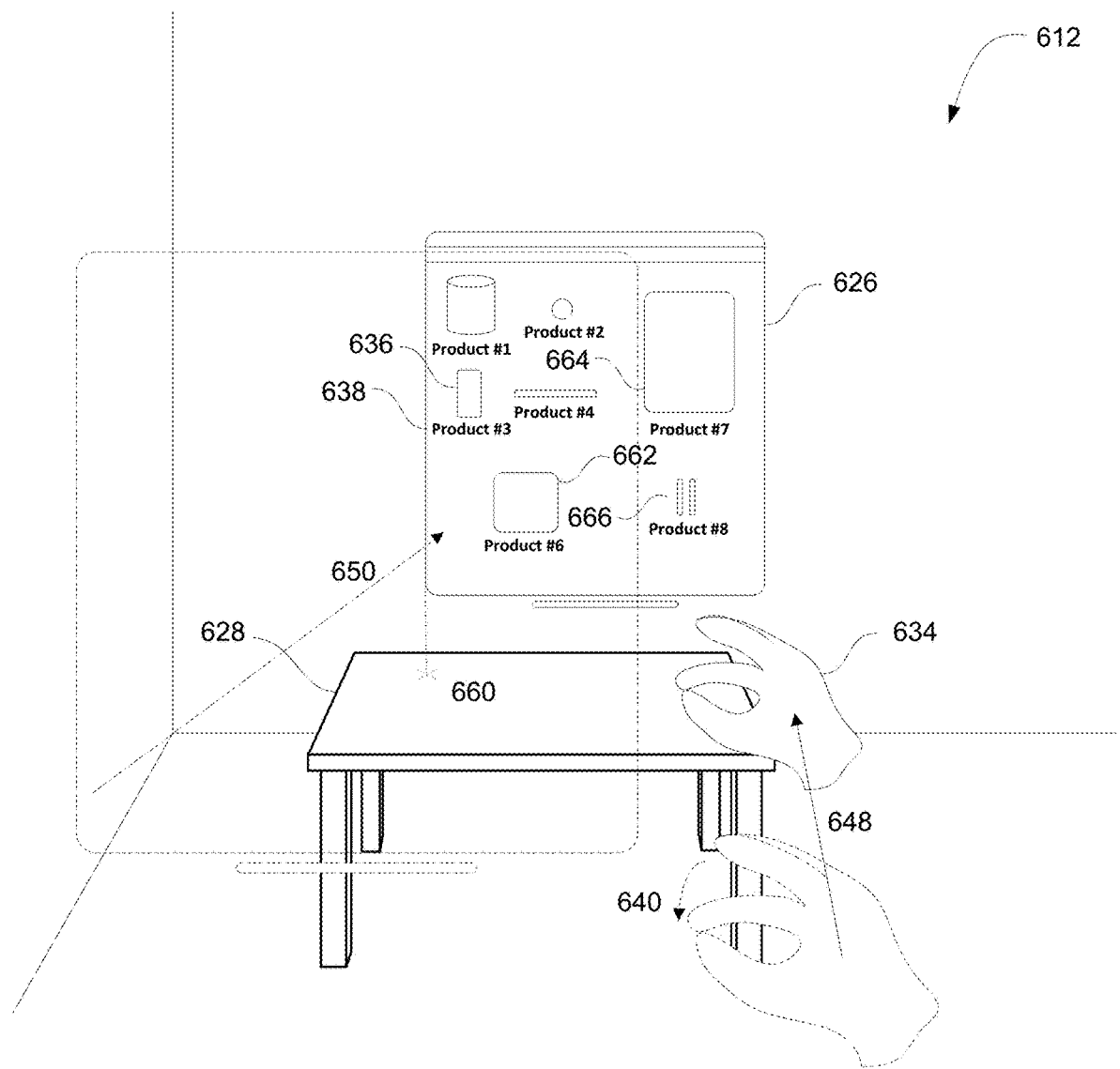
FIG. 6A illustrates window and object text counter-scaling and object representation rearrangement as a window is moved to a new location farther from the user in a 3D computer generated environment according to some embodiments of the disclosure.

FIG. 6A illustrates window and object text counter-scaling and object representation rearrangement as window 626 is moved to a new location farther from the user in 3D computer generated environment 612 according to some embodiments of the disclosure. The example of FIG. 6A is similar to the example of FIG. 5D, except that object text counter-scaling has been activated. The amount of counter-scaling of object text 638 can be a linear or nonlinear function of the detected distance of movement 548. As described above, object text counter-scaling can be a user-configurable setting that can be activated or deactivated by the user using control panel 458 as shown in FIG. 4B, or via any other user input. In FIG. 6A, window 626 has been moved backwards in 3D computer-generated environment 612 as indicated by marker 660, which shows the plane of the window being located towards the back of table 628. Because window counter-scaling has been activated, window 626 has increased in size relative to its actual size (e.g., without window counter-scaling) at that back location, while object representations 636 within the window are presented at their actual size and correct scale relative to each other within and with respect to the presented size and scale of 3D computer-generated environment 612, with their displayed size appropriate for their perceived distances from the user. Because object text counter-scaling has also been activated, object text 638 has increased in size relative to its actual size (e.g., its size without object text counter-scaling) and actual scale. In some embodiments, the amount of object text counter-scaling can follow the amount of window counter-scaling (e.g., the text scales with the window). In other embodiments, the amount of object text counter-scaling can be different from the amount of window counter-scaling. As shown in FIG. 6A, object text counter-scaling can allow text descriptors or other information in window 626 to be larger, more readable, and therefore more useful even though the window, object representations 636 and object text 638 may become very small.

Figure 6B:
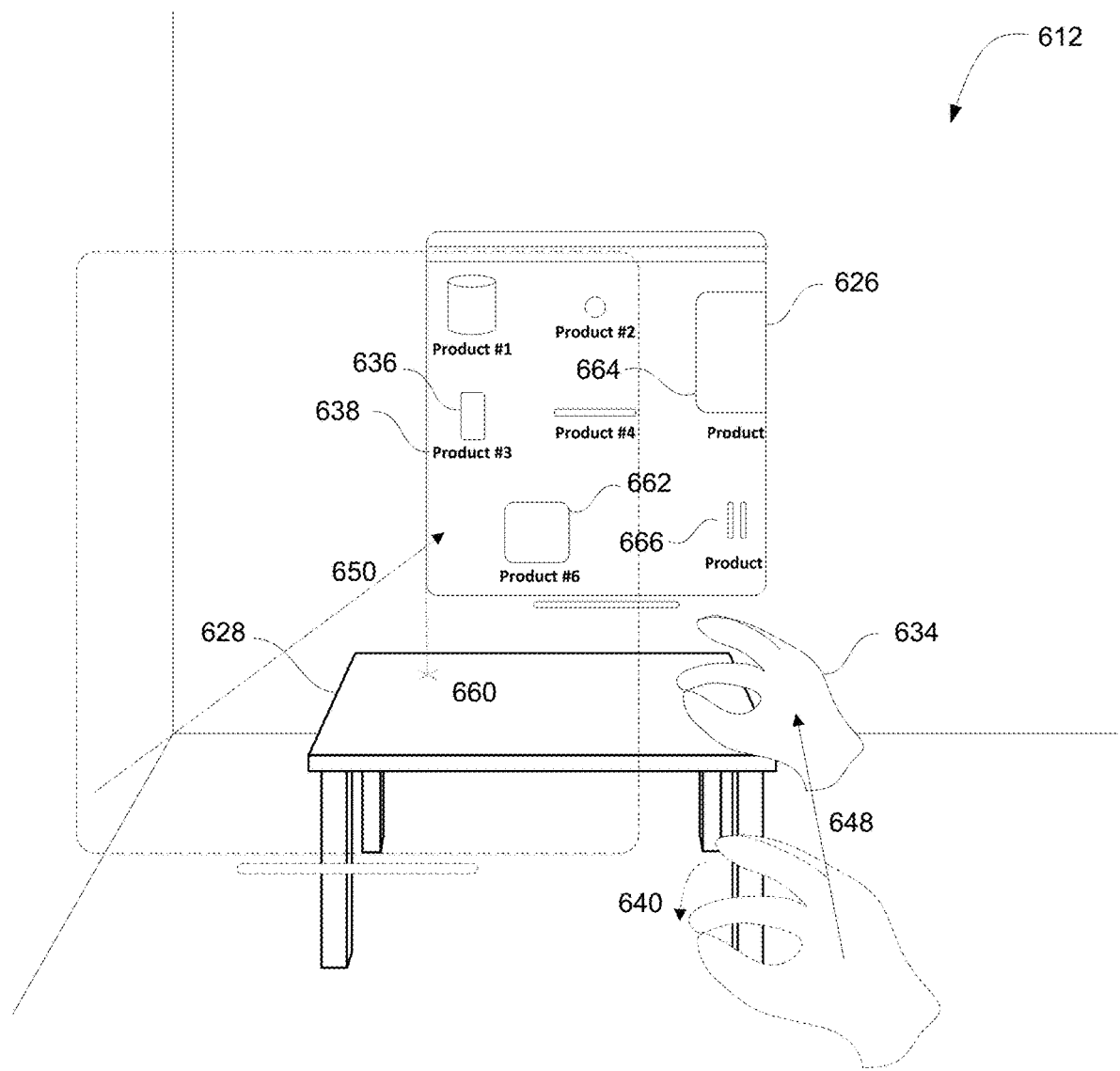
FIG. 6B illustrates window and object text counter-scaling with limited object representation rearrangement as a window is moved to a new location farther from the user in a 3D computer generated environment according to some embodiments of the disclosure.

FIG. 6B illustrates window and object text counter-scaling with limited object representation rearrangement as window 626 is moved to a new location farther from the user in 3D computer generated environment 612 according to some embodiments of the disclosure. The example of FIG. 6B is similar to the example of FIG. 6A, except that limited object representation rearrangement has been activated along with object text counter-scaling. Because object text counter-scaling has been activated, object text 638 has increased in size relative to its actual size (e.g., its size without text counter-scaling). However, if object representation rearrangement is based only on the size of object representations 636, as shown in the example of FIG. 6A, it is possible that the increased size of object text 638 (due to text counter-scaling) can cause the object text to extend beyond the size of window 612, or overlap with other elements within the window, and be partially obscured. Therefore, in some embodiments of the disclosure shown in FIG. 6B, object text counter-scaling can be employed with limited object representation rearrangement that takes into account the increased size of object text 638. In the example of FIG. 6B, limited object representation rearrangement has caused the layout to be more spread out than in the example of FIG. 6A to account for the increased size of object text 638 within window 626. As a result, the object representation rearrangement is more limited and fewer object representations are fully presented in window 626, but in general limited object representation rearrangement can result in the layout being less cluttered, with less chance of overlapping object text, and can be easier to peruse.

Figure 7:
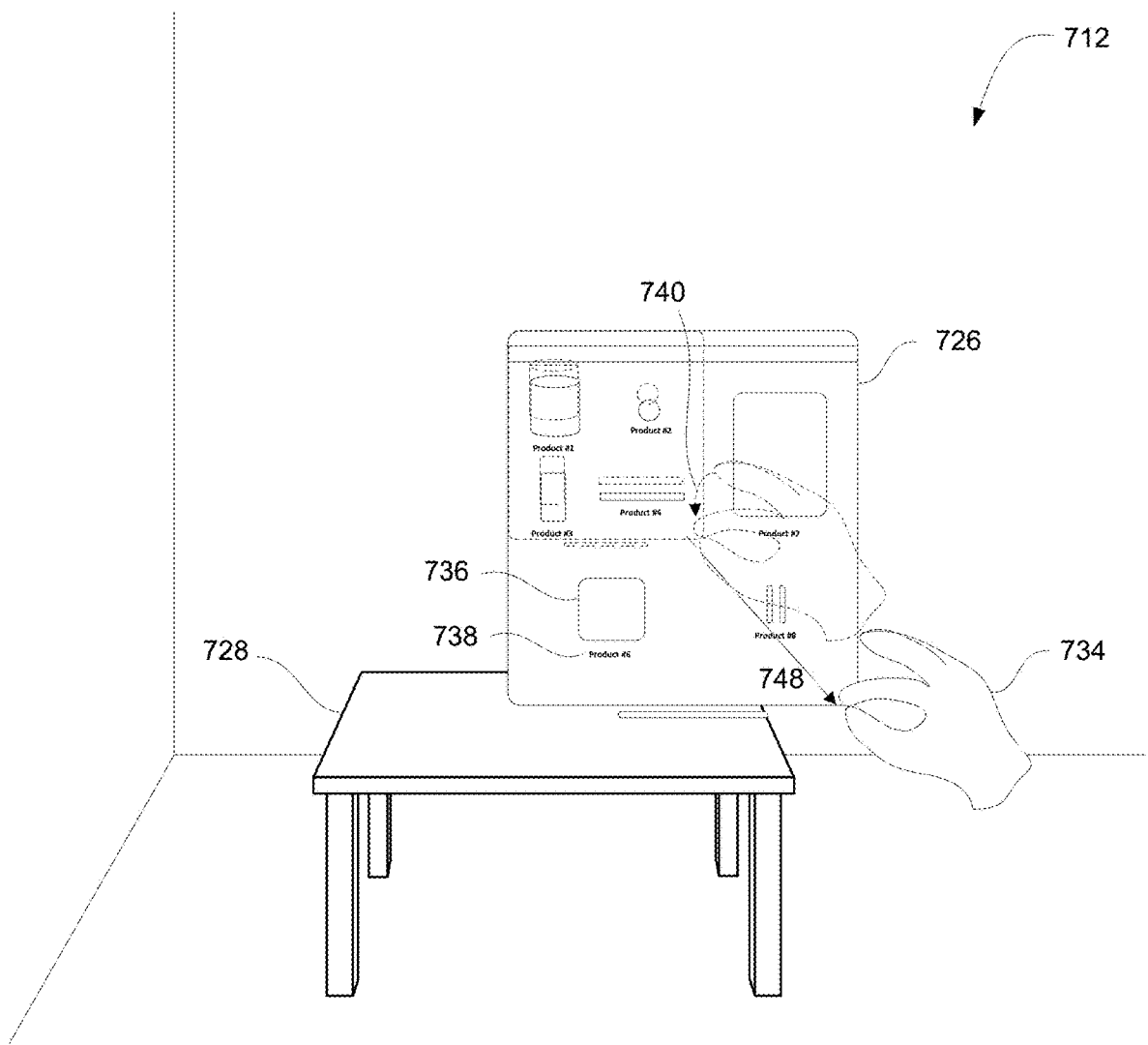
FIG. 7 illustrates object representation rearrangement as a window is resized in a 3D computer generated environment according to some embodiments of the disclosure.

FIG. 7 illustrates object representation rearrangement as window 726 is resized in 3D computer generated environment 712 according to some embodiments of the disclosure. The example of FIG. 7 can be a continuation of the example of FIG. 3C, where window 326 was moved to a location towards the back of 3D computer generated environment 312. As a result, window 326, object representations 336 and object text 338 in the window were small and difficult to see. In the example of FIG. 7, object representation rearrangement has been activated as discussed above. A user can perform a gesture in the physical environment that is recognizable by the electronic device, such as a thumb-index finger pinch (and hold) gesture 740 performed within a certain distance from a corner of the window (at the window's pre-resizing location indicated by the dashed lines in FIG. 7). This gesture, when recognized, can be mimicked by representation 734 in 3D computer generated environment 712. While holding the pinch, the user's hand can then be moved laterally and roughly diagonally away from the corner in approximately the same plane as the window, as shown at 748, which can once again be mimicked by representation 734 in 3D computer generated environment 712. To recognize this combined pinch-and-lateral translation gesture, the electronic device may track changes to the pose of the user's hand (e.g., the pinching of two fingers of the user's hand) and track movement of the hand (e.g., diagonal movement away from the corner of a window) in the physical environment, and cause representation 734 to similarly change its pose and movement in 3D computer-generated environment 712.

Upon recognizing this pinch-and-lateral translation gesture as a window resizing gesture or command, the electronic device can resize the window from its previous size (indicated by dashes) to a larger size as illustrated by window 726 in FIG. 7. The amount of resizing of window 726 can be a function of the detected distance of movement 748. However, it should be understood that this pinch-and-translate gesture to perform a window resizing gesture or command is just one example, and that other inputs, requests and/or gestures such as hand proximity or a finger tap followed by a lateral translation can also be employed. Because object representation rearrangement has been activated in the example of FIG. 7, the previous object representation layout (see dashed object outlines in FIG. 7) has been rearranged, and new object representations have now come into view to fill up the larger window 726 as shown by the solid object representation outlines (see, e.g., object representation 736). In this manner, more object representations can be presented within that window, all while maintaining their actual size and scale with respect to each other within and with respect to the presented size and scale of 3D computer-generated environment 712, to enhance the user experience and encourage user interaction.

Figure 8:
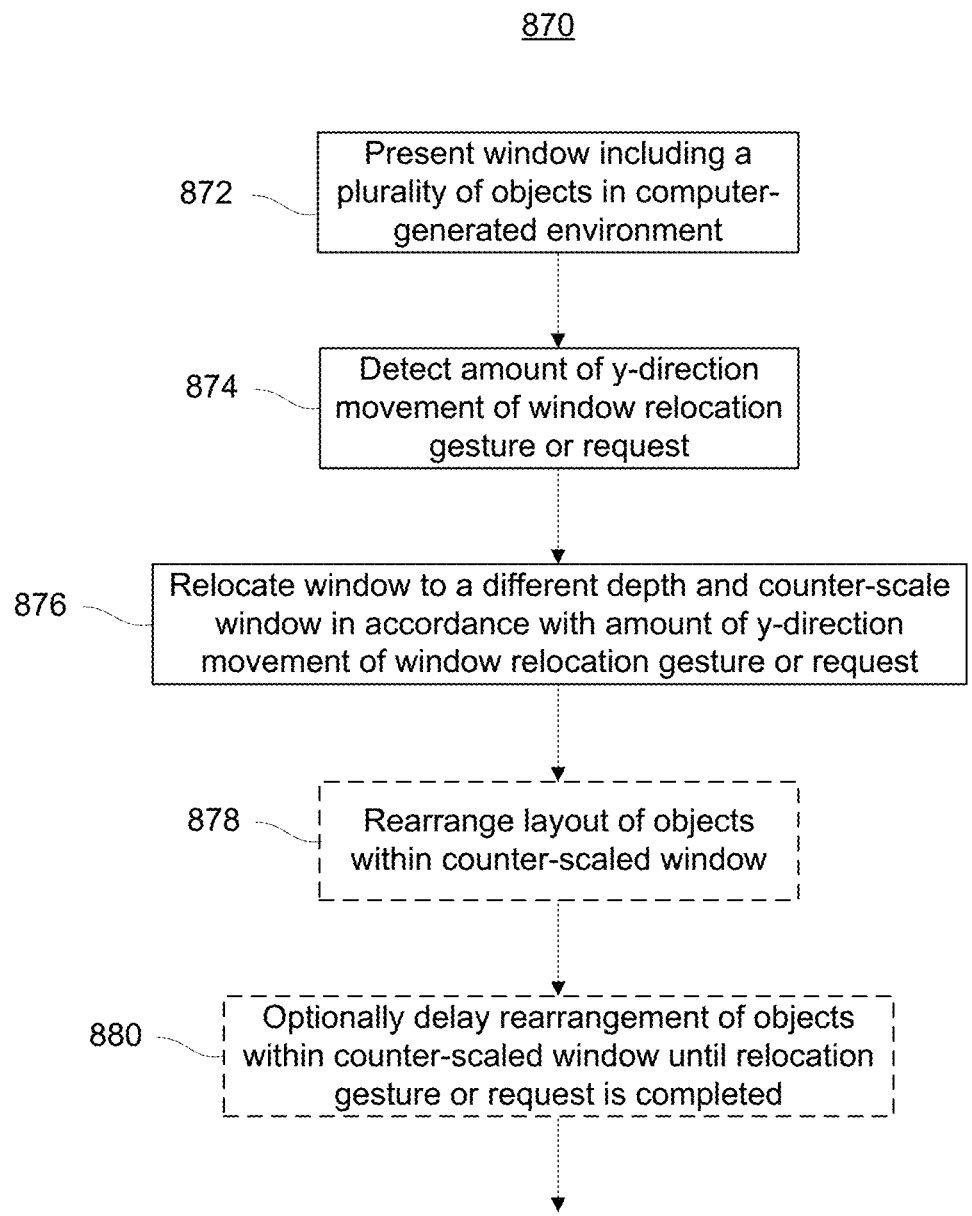
FIG. 8 is an example flow diagram illustrating a method of counter-scaling windows, and rearranging and/or counter-scaling object representations within those windows in a 3D computer-generated environment according to some embodiments of the disclosure.

FIG. 8 is an example flow diagram illustrating method 870 of counter-scaling windows, and rearranging and/or counter-scaling object representations within those windows in a 3D computer-generated environment according to some embodiments of the disclosure. Method 870 can be performed at an electronic device such as device 100, and device 200 when presenting, counter-scaling and rearranging object representations described above with reference to FIGS. 3A-3C, 4A, 4B, 5A-5F, 6A, 6B, and 7. In some embodiments, some operations in method 870 are optional and/or may be combined (as indicated by dashed lines), and/or the order of some operations may be changed. As described below, method 870 provides methods of counter-scaling windows, and rearranging and/or counter-scaling object representations within those windows in a 3D computer-generated environment according to some embodiments of the disclosure.

In FIG. 8, at 872, a window including a plurality of object representations can be presented in a 3D computer-generated environment. At 874, an amount of y-direction movement of a window relocation gesture or request can be detected. At 876, the window can be relocated to a different depth and the window can be counter-scaled in accordance with the amount of y-direction movement of the window relocation gesture or request. In some embodiments, at 878, the layout of object representations within the counter-scaled window can be rearranged. In some embodiments, at 880, the rearrangement of object representations within the counter-scaled window can be delayed until the window relocation gesture or request is completed.

Therefore, according to the above, some examples of the disclosure are directed to a method comprising, at an electronic device in communication with a display, presenting, via the display, a window and a first plurality of object representations within the window at a first depth in a three-dimensional (3D) computer-generated environment, the window having a first window scale and the first plurality of object representations having a first object scale with respect to the 3D computer-generated environment, in accordance with the presenting of the window at the first depth, detecting a request to relocate the window to a second depth different from the first depth, and in accordance with the detection of the request to relocate the window to the second depth, presenting the window and the first plurality of object representations within the window at the second depth in the 3D computer-generated environment, the window having a second window scale and the first plurality of object representations having a second object scale. Alternatively or additionally to one or more of the examples disclosed above, in some examples, the detection of the request to relocate the window to the second depth comprises detecting a window relocation gesture, and in accordance with the detection of the window relocation gesture, detecting a y-direction movement component of the window relocation gesture, and in accordance with the detection of the y-direction movement component of the window relocation gesture, presenting the window and the first plurality of object representations at the second depth, the second depth based on the detected y-direction movement component, and with a second window scale in the 3D computer-generated environment, the second window scale different from the first window scale. Alternatively or additionally to one or more of the examples disclosed above, in some examples the second window scale is equal to the first window scale. Alternatively or additionally to one or more of the examples disclosed above, in some examples the second object scale is different from the first object scale. Alternatively or additionally to one or more of the examples disclosed above, in some examples, in accordance with the presenting of the first plurality of object representations within the window at the first depth, presenting the window with a first window size and presenting the first plurality of object representations with a first layout in the 3D computer-generated environment, and in accordance with the presenting of the window at the second depth with the second window scale in the 3D computer-generated environment, presenting a second plurality of object representations within the window of a second window size at the second depth and with a second layout, the second layout different from the first layout. Alternatively or additionally to one or more of the examples disclosed above, in some examples the second layout is based on the second window size. Alternatively or additionally to one or more of the examples disclosed above, in some examples in accordance with the presenting of the first plurality of object representations within the window at the first depth, presenting a first plurality of object text with a first object text scale at the first depth, and in accordance with the presenting of the second plurality of object representations within the window at the second depth, presenting a second plurality of object text with a second object text scale different from the first object text scale at the second depth. Alternatively or additionally to one or more of the examples disclosed above, in some examples the presenting of the second plurality of object representations within the window at the second depth with the second layout is performed in accordance with a size of the second plurality of object text with the second object text scale. Alternatively or additionally to one or more of the examples disclosed above, in some examples the second window scale and the second object text scale are the same. Alternatively or additionally to one or more of the examples disclosed above, in some examples the second window scale is a non-linear function of a difference between the first and second depths. Alternatively or additionally to one or more of the examples disclosed above, in some examples in accordance with the detection of the y-direction movement component of the window relocation gesture, presenting the window with a different scale in accordance with a difference between the first and second depths. Alternatively or additionally to one or more of the examples disclosed above, in some examples in accordance with the detection of the y-direction movement component of the window relocation gesture, the presenting of the window at the first window scale is maintained, in accordance with detecting a relocation of the window from the first depth to the second depth in the 3D computer-generated environment, detecting a window relocation completion gesture, and in accordance with the detection of the window relocation completion gesture, presenting the window with the second window scale. Alternatively or additionally to one or more of the examples disclosed above, in some examples the first object scale of the first plurality of object representations presented in the window at the first depth is an actual scale of the object representations with respect to the 3D computer-generated environment, and the first object scale is maintained as the window is relocated from the first depth to the second depth. Alternatively or additionally to one or more of the examples disclosed above, in some examples in accordance with the presenting of the first plurality of object representations within the window at the first depth, presenting the first plurality of object representations within the window with a first layout in the 3D computer-generated environment, and in accordance with the detection of the y-direction movement component of the window relocation gesture, changing a layout of the first plurality of object representations in accordance with an amount of the y-direction movement component as the window relocates from the first depth to the second depth. Alternatively or additionally to one or more of the examples disclosed above, in some examples in accordance with the presenting of the first plurality of object representations within the window at the first depth, presenting the first plurality of object representations within the window with a first layout in the 3D computer-generated environment, in accordance with the presenting of the window with the second window scale at the second depth in the 3D computer-generated environment, presenting the first plurality of object representations within the window at the second depth with the first layout, while presenting the first plurality of object representations within the window at the second depth with the first layout, detecting a window relocation completion gesture, and in accordance with the detection of the window relocation completion gesture, presenting the first plurality of object representations within the window with a second layout, the second layout different from the first layout. Alternatively or additionally to one or more of the examples disclosed above, in some examples in accordance with the presenting of the window at the second depth with the second window scale in the 3D computer-generated environment, determining that the window has been selected and a window resizing gesture has been detected, and in accordance with the detection of the window resizing gesture, detecting an amount of x-direction and z-direction movement components of the window resizing gesture, and in accordance with the detected amount of the x-direction and the z-direction movement components of the window resizing gesture, resizing the window to a third window scale at the second depth. Alternatively or additionally to one or more of the examples disclosed above, in some examples in accordance with the presenting of the first plurality of object representations within the window at the first depth, presenting the window with a first window size and presenting the first plurality of object representations with a first layout in the 3D computer-generated environment, and in accordance with the presenting of the window with the third window scale at the second depth in the 3D computer-generated environment, presenting a second plurality of object representations with a second layout within the window at the third window scale at the second depth, the second layout different from the first layout.

Some examples of the disclosure are directed to an electronic device, comprising one or more processors, memory, and one or more programs, wherein the one or more programs are stored in the memory and configured to be executed by the one or more processors, the one or more programs including instructions for: presenting, via the display, a window and a first plurality of object representations within the window at a first depth in a three-dimensional (3D) computer-generated environment, the window having a first window scale and the first plurality of object representations having a first object scale with respect to the 3D computer-generated environment, in accordance with the presenting of the window at the first depth, detecting a request to relocate the window to a second depth different from the first depth, and in accordance with the detection of the request to relocate the window to the second depth, presenting the window and the first plurality of object representations within the window at the second depth in the 3D computer-generated environment, the window having a second window scale and the first plurality of object representations having a second object scale. Alternatively or additionally to one or more of the examples disclosed above, in some examples the detection of the request to relocate the window to the second depth comprises detecting a window relocation gesture, and the one or more programs include instructions for, in accordance with the detection of the window relocation gesture, detecting a y-direction movement component of the window relocation gesture, and in accordance with the detection of the y-direction movement component of the window relocation gesture, presenting the window and the first plurality of object representations at the second depth, the second depth based on the detected y-direction movement component, and with a second window scale in the 3D computer-generated environment, the second window scale different from the first window scale. Alternatively or additionally to one or more of the examples disclosed above, in some examples the second window scale is equal to the first window scale. Alternatively or additionally to one or more of the examples disclosed above, in some examples the second object scale is different from the first object scale.

Some examples of the disclosure are directed to a non-transitory computer readable storage medium storing one or more programs, the one or more programs comprising instructions, which when executed by one or more processors of an electronic device, cause the electronic device to: present, via the display, a window and a first plurality of object representations within the window at a first depth in a three-dimensional (3D) computer-generated environment, the window having a first window scale and the first plurality of object representations having a first object scale with respect to the 3D computer-generated environment, in accordance with the presenting of the window at the first depth, detect a request to relocate the window to a second depth different from the first depth, and in accordance with the detection of the request to relocate the window to the second depth, present the window and the first plurality of object representations within the window at the second depth in the 3D computer-generated environment, the window having a second window scale and the first plurality of object representations having a second object scale. Alternatively or additionally to one or more of the examples disclosed above, in some examples the detection of the request to relocate the window to the second depth comprises detecting a window relocation gesture, and the one or more programs comprising instructions, which when executed by the one or more processors of the electronic device, cause the electronic device to: in accordance with the detection of the window relocation gesture, detect a y-direction movement component of the window relocation gesture, and in accordance with the detection of the y-direction movement component of the window relocation gesture, present the window and the first plurality of object representations at the second depth, the second depth based on the detected y-direction movement component, and with a second window scale in the 3D computer-generated environment, the second window scale different from the first window scale. Alternatively or additionally to one or more of the examples disclosed above, in some examples the second window scale is equal to the first window scale. Alternatively or additionally to one or more of the examples disclosed above, in some examples the second object scale is different from the first object scale.

Some examples of the disclosure are directed to an electronic device, comprising one or more processors, memory, means for presenting, via the display, a window and a first plurality of object representations within the window at a first depth in a three-dimensional (3D) computer-generated environment, the window having a first window scale and the first plurality of object representations having a first object scale with respect to the 3D computer-generated environment, in accordance with the presenting of the window at the first depth, means for detecting a request to relocate the window to a second depth different from the first depth, and in accordance with the detection of the request to relocate the window to the second depth, means for presenting the window and the first plurality of object representations within the window at the second depth in the 3D computer-generated environment, the window having a second window scale and the first plurality of object representations having a second object scale.

Some examples of the disclosure are directed to an information processing apparatus for use in an electronic device, the information processing apparatus comprising means for presenting, via the display, a window and a first plurality of object representations within the window at a first depth in a three-dimensional (3D) computer-generated environment, the window having a first window scale and the first plurality of object representations having a first object scale with respect to the 3D computer-generated environment, in accordance with the presenting of the window at the first depth, detect a request to relocate the window to a second depth different from the first depth, and in accordance with the detection of the request to relocate the window to the second depth, present the window and the first plurality of object representations within the window at the second depth in the 3D computer-generated environment, the window having a second window scale and the first plurality of object representations having a second object scale.

Some examples of the disclosure are directed to an electronic device, comprising one or more processors, memory, and one or more programs, wherein the one or more programs are stored in the memory and configured to be executed by the one or more processors, the one or more programs including instructions for performing any of the methods described above.

Some examples of the disclosure are directed to a non-transitory computer readable storage medium storing one or more programs, the one or more programs comprising instructions, which when executed by one or more processors of an electronic device, cause the electronic device to perform any of the methods described above.

Some examples of the disclosure are directed to electronic device, comprising one or more processors, memory, and means for performing any of the methods described above.

Some examples of the disclosure are directed to an information processing apparatus for use in an electronic device, the information processing apparatus comprising means for performing any of the methods described above.

The foregoing description, for purposes of explanation, has been described with reference to specific embodiments. However, the illustrative discussions above are not intended to be exhaustive or to limit embodiments of the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
   at an electronic device in communication with a display:
   presenting, via the display, a window and a first plurality of object representations within the window at a first depth in a three-dimensional (3D) computer-generated environment, the window having a first window scale and the first plurality of object representations having a first object scale, wherein the first window scale causes the window to be presented at a first window size with respect to the 3D computer-generated environment and the first object scale causes the first plurality of object representations to be presented at a first object size with respect to the 3D computer-generated environment;
   detecting a request to relocate the window to a second depth different from the first depth; and
   in accordance with the detection of the request to relocate the window to the second depth, presenting the window and the first plurality of object representations within the window at the second depth in the 3D computer-generated environment, the window having a second window scale and the first plurality of object representations having a second object scale.

2. The method of claim 1, wherein the detection of the request to relocate the window to the second depth comprises detecting a window relocation gesture; and
   in accordance with the detection of the window relocation gesture,
      detecting a y-direction movement component of the window relocation gesture, and
      in accordance with the detection of the y-direction movement component of the window relocation gesture, presenting the window and the first plurality of object representations at the second depth, the second depth based on the detected y-direction movement component, and with a second window scale in the 3D computer-generated environment, the second window scale different from the first window scale.

3. The method of claim 1, wherein the second window scale is equal to the first window scale.

4. The method of claim 1, wherein the second object scale is different from the first object scale.

5. The method of claim 1, wherein in accordance with the presenting of the first plurality of object representations within the window at the first depth, presenting the window with a first window size and presenting the first plurality of object representations with a first layout in the 3D computer-generated environment; and
   in accordance with the presenting of the window at the second depth with the second window scale in the 3D computer-generated environment, presenting a second plurality of object representations within the window of a second window size at the second depth and with a second layout, the second layout different from the first layout.

6. The method of claim 5, wherein the second layout is based on the second window size.

7. The method of claim 5, wherein in accordance with the presenting of the first plurality of object representations within the window at the first depth, presenting a first plurality of object text with a first object text scale at the first depth; and
   in accordance with the presenting of the second plurality of object representations within the window at the second depth, presenting a second plurality of object text with a second object text scale different from the first object text scale at the second depth.

8. The method of claim 7, wherein the presenting of the second plurality of object representations within the window at the second depth with the second layout is performed in accordance with a size of the second plurality of object text with the second object text scale.

9. The method of claim 7, wherein the second window scale and the second object text scale are the same.

10. The method of claim 1, wherein the second window scale is a non-linear function of a difference between the first and second depths.

11. The method of claim 2, wherein in accordance with the detection of the y-direction movement component of the window relocation gesture, presenting the window with a different scale in accordance with a difference between the first and second depths.

12. The method of claim 2, wherein in accordance with the detection of the y-direction movement component of the window relocation gesture, the presenting of the window at the first window scale is maintained;
    in accordance with detecting a relocation of the window from the first depth to the second depth in the 3D computer-generated environment, detecting a window relocation completion gesture; and
    in accordance with the detection of the window relocation completion gesture, presenting the window with the second window scale.

13. The method of claim 2, wherein the first object scale of the first plurality of object representations presented in the window at the first depth is an actual scale of the object representations with respect to the 3D computer-generated environment, and the first object scale is maintained as the window is relocated from the first depth to the second depth.

14. The method of claim 2, wherein in accordance with the presenting of the first plurality of object representations within the window at the first depth, presenting the first plurality of object representations within the window with a first layout in the 3D computer-generated environment; and
    in accordance with the detection of the y-direction movement component of the window relocation gesture, changing a layout of the first plurality of object representations in accordance with an amount of the y-direction movement component as the window relocates from the first depth to the second depth.

15. The method of claim 2, wherein in accordance with the presenting of the first plurality of object representations within the window at the first depth, presenting the first plurality of object representations within the window with a first layout in the 3D computer-generated environment;
    in accordance with the presenting of the window with the second window scale at the second depth in the 3D computer-generated environment, presenting the first plurality of object representations within the window at the second depth with the first layout;
    while presenting the first plurality of object representations within the window at the second depth with the first layout, detecting a window relocation completion gesture; and
    in accordance with the detection of the window relocation completion gesture, presenting the first plurality of object representations within the window with a second layout, the second layout different from the first layout.

16. The method of claim 1, wherein in accordance with the presenting of the window at the second depth with the second window scale in the 3D computer-generated environment, determining that the window has been selected and a window resizing gesture has been detected; and
in accordance with the detection of the window resizing gesture,
detecting an amount of x-direction and z-direction movement components of the window resizing gesture, and
in accordance with the detected amount of the x-direction and the z-direction movement components of the window resizing gesture, resizing the window to a third window scale at the second depth.

17. The method of claim 16, wherein in accordance with the presenting of the first plurality of object representations within the window at the first depth, presenting the window with a first window size and presenting the first plurality of object representations with a first layout in the 3D computer-generated environment; and
in accordance with the presenting of the window with the third window scale at the second depth in the 3D computer-generated environment, presenting a second plurality of object representations with a second layout within the window at the third window scale at the second depth, the second layout different from the first layout.

18. An electronic device, comprising:
one or more processors;
memory; and
one or more programs, wherein the one or more programs are stored in the memory and configured to be executed by the one or more processors, the one or more programs including instructions for:
presenting, via a display, a window and a first plurality of object representations within the window at a first depth in a three-dimensional (3D) computer-generated environment, the window having a first window scale and the first plurality of object representations having a first object scale, wherein the first window scale causes the window to be presented at a first window size with respect to the 3D computer-generated environment and the first object scale causes the first plurality of object representations to be presented at a first object size with respect to the 3D computer-generated environment
detecting a request to relocate the window to a second depth different from the first depth; and
in accordance with the detection of the request to relocate the window to the second depth, presenting the window and the first plurality of object representations within the window at the second depth in the 3D computer-generated environment, the window having a second window scale and the first plurality of object representations having a second object scale.

19. The electronic device of claim 18, wherein the detection of the request to relocate the window to the second depth comprises detecting a window relocation gesture, and the one or more programs including instructions for:
in accordance with the detection of the window relocation gesture,
detecting a y-direction movement component of the window relocation gesture, and
in accordance with the detection of the y-direction movement component of the window relocation gesture, presenting the window and the first plurality of object representations at the second depth, the second depth based on the detected y-direction movement component, and with a second window scale in the 3D computer-generated environment, the second window scale different from the first window scale.

20. The electronic device of claim 18, wherein the second window scale is equal to the first window scale.

21. The electronic device of claim 18, wherein the second object scale is different from the first object scale.

22. A non-transitory computer readable storage medium storing one or more programs, the one or more programs comprising instructions, which when executed by one or more processors of an electronic device, cause the electronic device to:
present, via a display, a window and a first plurality of object representations within the window at a first depth in a three-dimensional (3D) computer-generated environment, the window having a first window scale and the first plurality of object representations having a first object scale, wherein the first window scale causes the window to be presented at a first window size with respect to the 3D computer-generated environment and the first object scale causes the first plurality of object representations to be presented at a first object size with respect to the 3D computer-generated environment;
detect a request to relocate the window to a second depth different from the first depth; and
in accordance with the detection of the request to relocate the window to the second depth, present the window and the first plurality of object representations within the window at the second depth in the 3D computer-generated environment, the window having a second window scale and the first plurality of object representations having a second object scale.

23. The non-transitory computer readable storage medium of claim 22, wherein the detection of the request to relocate the window to the second depth comprises detecting a window relocation gesture, and the one or more programs comprising instructions, which when executed by the one or more processors of the electronic device, cause the electronic device to:
in accordance with the detection of the window relocation gesture,
detect a y-direction movement component of the window relocation gesture, and
in accordance with the detection of the y-direction movement component of the window relocation gesture, present the window and the first plurality of object representations at the second depth, the second depth based on the detected y-direction movement component, and with a second window scale in the 3D computer-generated environment, the second window scale different from the first window scale.

24. The non-transitory computer readable storage medium of claim 22, wherein the second window scale is equal to the first window scale.

25. The non-transitory computer readable storage medium of claim 22, wherein the second object scale is different from the first object scale.

26. The method of claim 1, wherein the first object scale is equal to the second object scale.

27. The electronic device of claim 18, wherein the first object scale is equal to the second object scale.

28. The non-transitory computer readable storage medium of claim 22, wherein the first object scale is equal to the second object scale.

\* \* \* \* \*